US010116825B2

(12) United States Patent
Saito

(10) Patent No.: US 10,116,825 B2
(45) Date of Patent: Oct. 30, 2018

(54) CONTROL SERVER

(71) Applicant: BROTHER KOGYO KABUSHIKI KAISHA, Nagoya, Aichi (JP)

(72) Inventor: Ken Saito, Tokoname (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

(21) Appl. No.: 15/404,456

(22) Filed: Jan. 12, 2017

(65) Prior Publication Data

US 2017/0208201 A1    Jul. 20, 2017

(30) Foreign Application Priority Data

Jan. 15, 2016   (JP) ................. 2016-006485

(51) Int. Cl.

| H04N 1/00 | (2006.01) |
|---|---|
| H04N 1/60 | (2006.01) |
| H04N 1/64 | (2006.01) |
| G06F 3/12 | (2006.01) |
| H04N 1/21 | (2006.01) |
| G06K 15/02 | (2006.01) |

(52) U.S. Cl.
CPC ....... *H04N 1/00973* (2013.01); *H04N 1/0022* (2013.01); *H04N 1/00228* (2013.01);
(Continued)

(58) Field of Classification Search
CPC ............. H04N 1/0022; H04N 1/00228; H04N 1/00236; H04N 1/00244; H04N 1/00344; H04N 1/00973; H04N 1/2108; H04N 1/60; H04N 1/644; H04N 1/0402; H04N 1/2166; G06F 17/30; G06F 17/30005; G06F 17/30011; G06F 3/1205; G06F 3/1224; G06F 3/1242; G06F 3/1244; G06F 3/1275; G06F 3/1285; G06F 3/1297

(Continued)

(56) References Cited

U.S. PATENT DOCUMENTS

| 5,621,541 A | 4/1997 | Sakai et al. |
|---|---|---|
| 2004/0212842 A1* | 10/2004 | Miyamoto ......... H04N 1/00241 358/407 |

(Continued)

FOREIGN PATENT DOCUMENTS

| JP | H05-136961 A | 6/1993 |
|---|---|---|
| JP | 2001-313752 | 11/2001 |

*Primary Examiner* — Chad Dickerson
(74) *Attorney, Agent, or Firm* — Scully, Scott, Murphy & Presser, PC

(57) ABSTRACT

A control server may receive, from a multifunction peripheral, instruction information; send a scan instruction for generating first scan data to the multifunction peripheral in a case where the instruction information is received, send, to the multifunction peripheral, a sending instruction for sending the first scan data to a predetermined server in the case where the instruction information is received, send, to the multifunction peripheral, a print instruction for receiving, from the predetermined server, second scan data obtained using the first scan data, and for printing the document image represented by the second scan data in the case where the instruction information is received and executes a predetermined process for saving, in the destination apparatus, third scan data obtained using the first scan data in the case where the instruction information is received.

9 Claims, 13 Drawing Sheets

(52) U.S. Cl.
CPC ....... *H04N 1/00344* (2013.01); *H04N 1/2108* (2013.01); *H04N 1/60* (2013.01); *H04N 1/644* (2013.01); *H04N 2201/0094* (2013.01)

(58) Field of Classification Search
USPC ......... 358/1.1, 1.9, 2.1, 1.11–1.18, 400–404; 709/201–203, 217–219
See application file for complete search history.

(56) References Cited

U.S. PATENT DOCUMENTS

| | | | |
|---|---|---|---|
| 2012/0081740 A1* | 4/2012 | Takagi | G06F 3/1205 358/1.15 |
| 2012/0182575 A1* | 7/2012 | Ikeda | H04N 1/00225 358/1.15 |
| 2014/0240727 A1* | 8/2014 | Imai | G06F 3/12 358/1.9 |
| 2014/0240775 A1* | 8/2014 | Suzuki | G06F 3/1292 358/1.15 |
| 2015/0358503 A1* | 12/2015 | Hirao | H04N 1/3935 358/474 |
| 2016/0255220 A1* | 9/2016 | Oguma | H04N 1/00854 358/1.13 |
| 2016/0277594 A1* | 9/2016 | Moribayashi | H04N 1/00941 |
| 2017/0171413 A1* | 6/2017 | Kim | H04N 1/00015 |

* cited by examiner

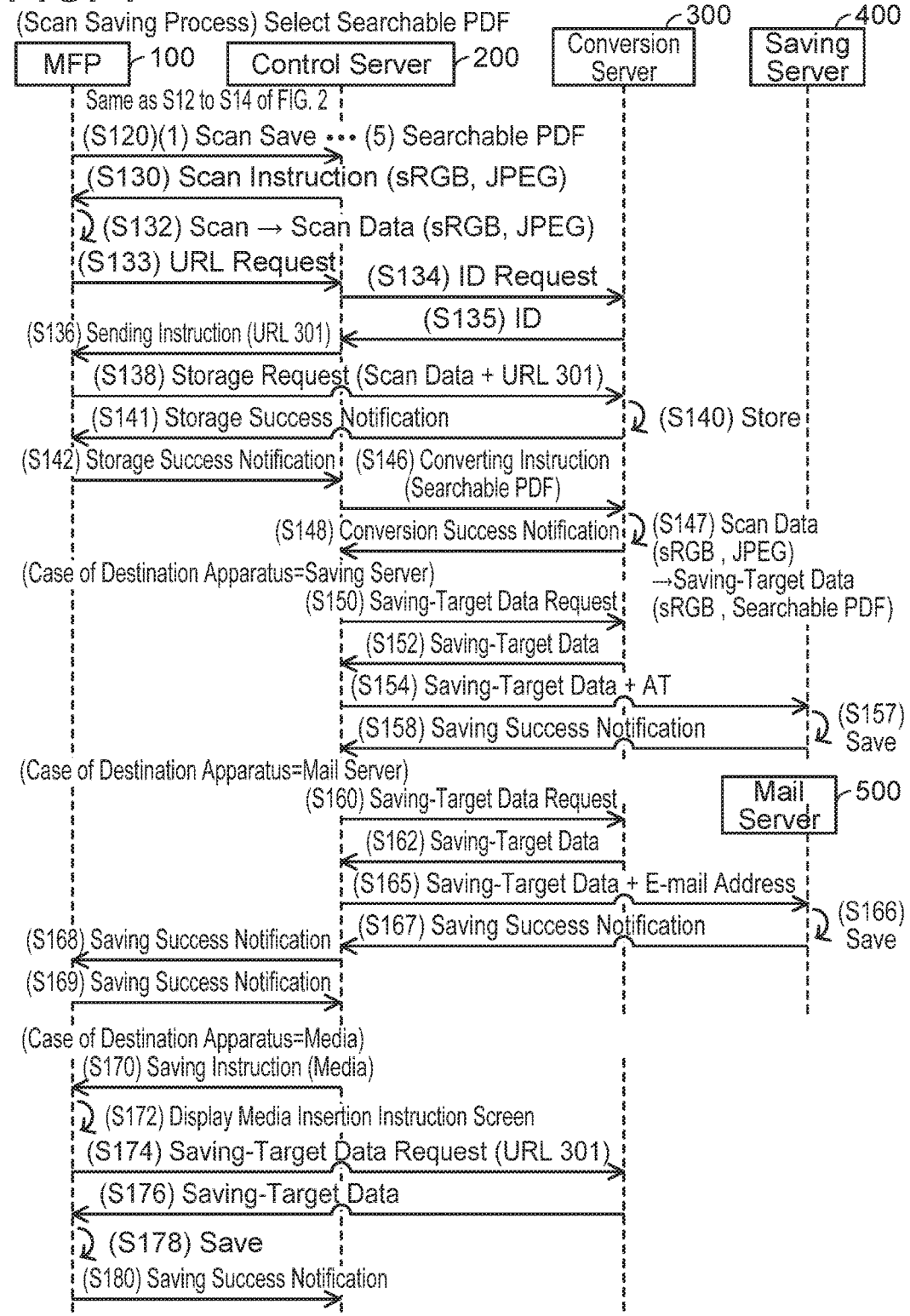

FIG. 5

| File Format | Specific Color Conversion Process | File Format Conversion Process |
|---|---|---|
| JPG | ○ | × |
| PDF | ○ | × |
| Searchable PDF | ○ | ○ |
| DOC | ○ | ○ |
| PDF/A | × | × |
| Signed PDF | × | × |

- MFP is Capable of Generating: JPG, PDF
- MFP is Incapable of Generating: Searchable PDF, DOC
- MFP is Capable of Generating: PDF/A, Signed PDF (First Embodiment)
○ : Conversion Server 300 Executes Process
× : Conversion Server 300 Does Not Execute Process (Second Embodiment)
○ : MFP 100 Executes Process
× : MFP 100 Does Not Execute Process

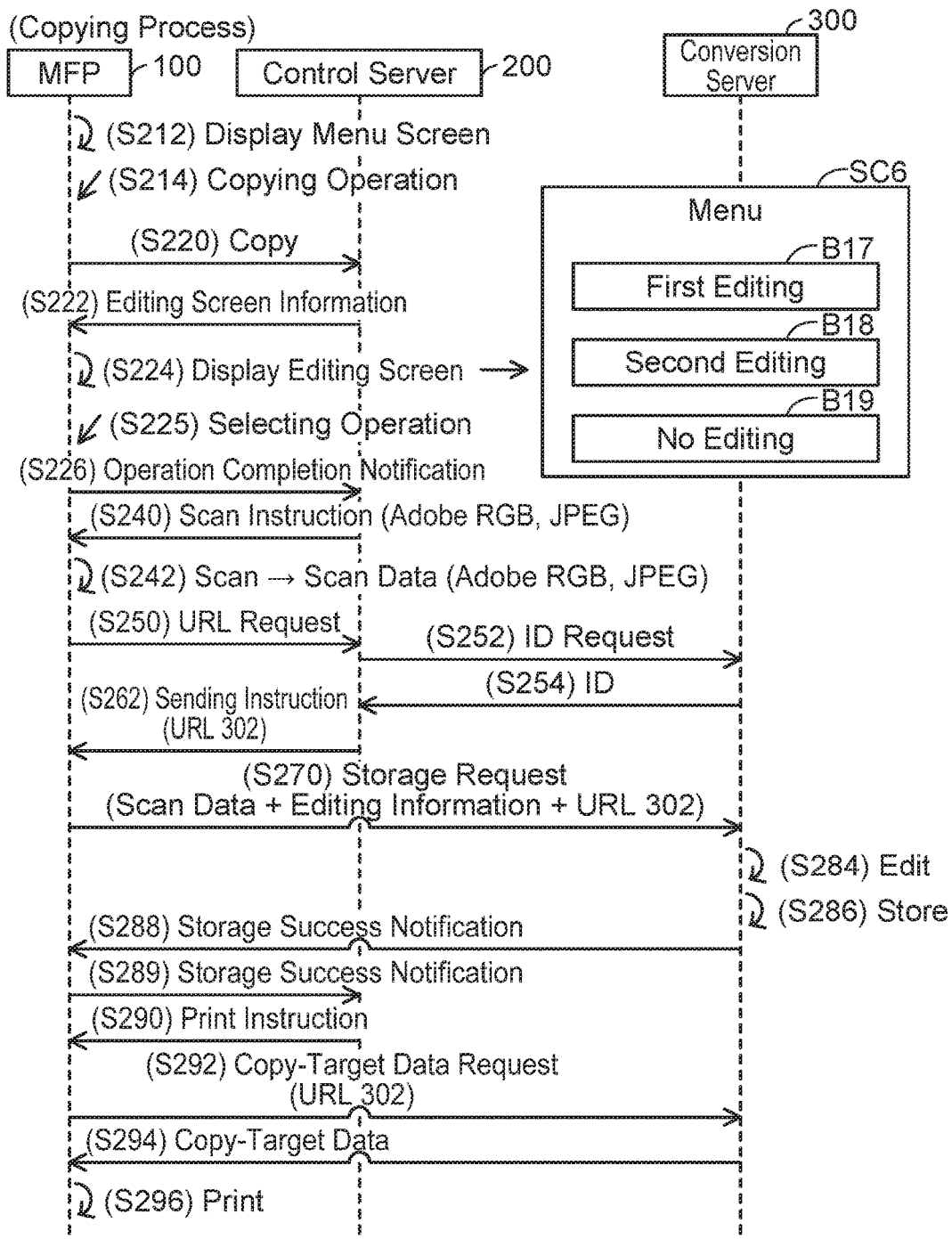

(First Embodiment)
  Select JPEG → Case A of FIG. 8
  Select Searchable PDF → Case B of FIG. 10
  Select Signed PDF → Case C of FIG. 11

(Second Embodiment)
  Select JPEG → Case D of FIG. 12
  Select Searchable PDF → Case E of FIG. 13
  Select Signed PDF → Case F of FIG. 14

(Second Embodiment) (Case E) Select Searchable PDF

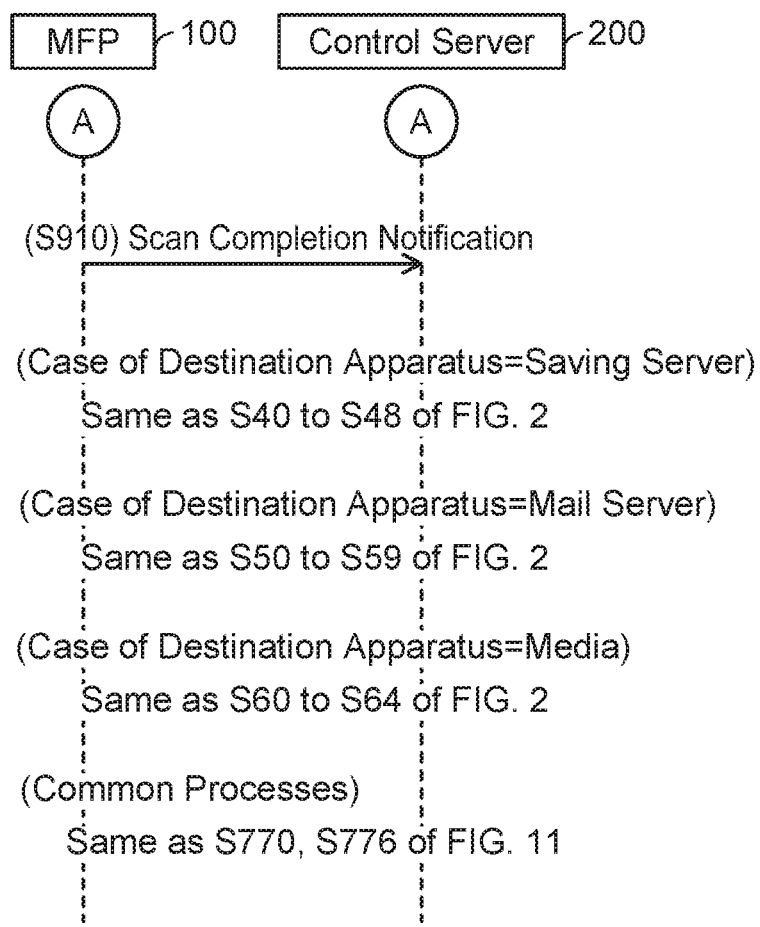

CONTROL SERVER

TECHNICAL FIELD

The art disclosed herein relates to a control server configured to control a multifunction peripheral capable of executing scan and print.

DESCRIPTION OF RELATED ART

An image processing system is known. The image processing system executes scanning of a document to generate scan data in response to a predetermined operation performed by a user. The image processing system uses the scan data to execute duplication of the document. Further, without executing the scanning of the document again, the image processing system executes a facsimile transmission of scan data that is the same as the scan data used for duplicating the document.

SUMMARY

In the above technique, the image processing system is not controlled by an external apparatus. The present specification provides an art that realizes to allow a control server configured to control a multifunction peripheral, without causing the multifunction peripheral to perform plural times of scanning of a document image, to save scan data representing the document image in a destination apparatus, and copy the document image, in response to a predetermined instruction being accepted at the multifunction peripheral.

A control server disclosed in the present specification is a control server configured to control a multifunction peripheral capable of executing scan and print. The control server may comprise: a processor; and a first memory storing computer-readable instructions therein, the computer-readable instructions, when executed by the processor, causing the control server to: receive, from the multifunction peripheral, instruction information indicating that a first instruction has been accepted at the multifunction peripheral, the instruction information including information for executing both processes of a scan saving process for saving scan data representing a document image in a destination apparatus and a copying process for copying the document image; in a case where the instruction information is received, send a scan instruction to the multifunction peripheral, the scan instruction being for causing the multifunction peripheral to execute a generating process included in the both processes, the generating process being for generating first scan data representing the document image; send a sending instruction to the multifunction peripheral, the sending instruction being for causing the multifunction peripheral to execute a sending process included in the copying process, the sending process being for sending the first scan data to a predetermined server configured separately from the multifunction peripheral; send a print instruction to the multifunction peripheral, the print instruction being for causing the multifunction peripheral to execute a receiving process and a printing process that are included in the copying process, the receiving process being for receiving, from the predetermined server, second scan data obtained using the first scan data, and the print process being for printing the document image represented by the second scan data; and execute a predetermined process included in the scan saving process, the predetermined process being for saving, in the destination apparatus, third scan data obtained using the first scan data.

The present specification also discloses a following control server. The control server may comprise: a processor; and a memory storing computer-readable instructions therein, the computer-readable instructions, when executed by the processor, causing the control server to: receive, from the multifunction peripheral, instruction information indicating that a first instruction has been accepted at the multifunction peripheral, the instruction information including information for executing both processes of a scan saving process for saving scan data representing a document image in a destination apparatus and a copying process for copying the document image; in a case where the instruction information is received, send a scan instruction to the multifunction peripheral, the scan instruction being for causing the multifunction peripheral to execute a generating process included in the both processes, the generating process being for generating first scan data representing the document image and expressed by a first color space; send a print instruction to the multifunction peripheral, the print instruction being for causing the multifunction peripheral to execute a printing process included in the copying process, the printing process being for printing the document image represented by second scan data obtained using the first scan data and expressed by a second color space; and execute a predetermined process included in the scan saving process, the predetermined process being for saving, in the destination apparatus, third scan data obtained using the first scan data and expressed by a third color space, wherein one of the second color space and the third color space is a same color space as the first color space, the other of the second color space and the third color space is a different color space from the first color space, and scan data expressed by the different color space among the second scan data and the third scan data is generated by a color converting process on the first scan data.

A control method and computer-readable instructions for implementation of the control server described above, and a non-transitory computer-readable recording medium in which the computer-readable instructions are stored, are also novel and useful.

BRIEF DESCRIPTION OF DRAWINGS

FIG. 4 illustrates a sequence diagram of a scan saving process in a case where Searchable PDF is selected;

FIG. 5 illustrates a table representing relations between file formats and processes to be executed;

FIG. 6 illustrates a sequence diagram of a copying process;

FIG. 13 illustrates a sequence diagram of Case F where Signed PDF is selected.

EMBODIMENTS (First Embodiment)
(Configuration of Communication System 2; FIG. 1)

Figure 1:
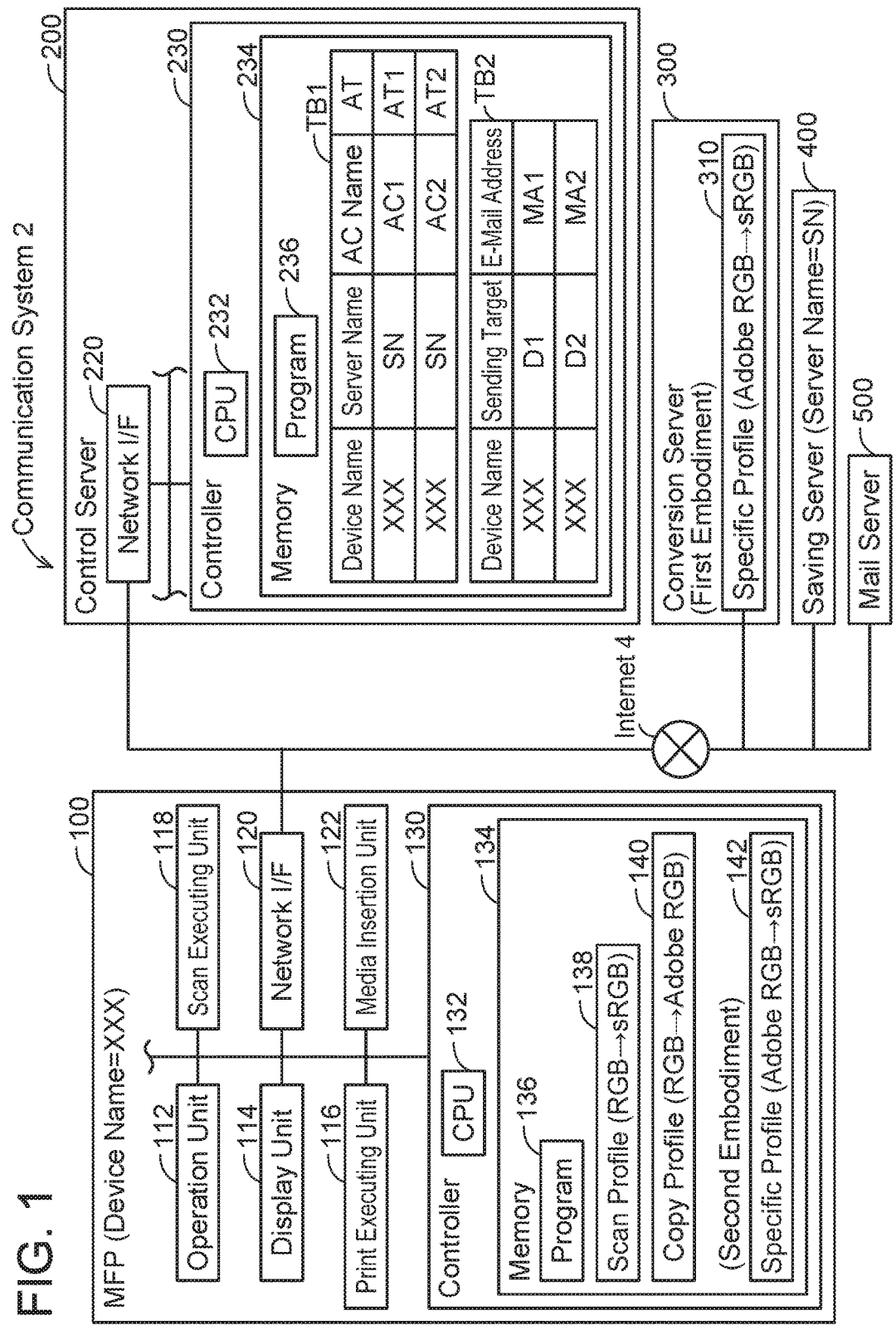
FIG. 1 illustrates a configuration of a communication system.

A communication system 2 comprises a multifunction peripheral 100, a control server 200, and a conversion server 300. The apparatuses 100 to 300 can communicate with each other via the Internet 4. Further, the Internet 4 provides a saving server 400 and a mail server 500. Hereinafter, the multifunction peripheral 100 will be abbreviated as "MFP 100".

(Configuration of MFP 100)

The MFP 100 is a peripheral (i.e., a peripheral of an unillustrated PC (abbreviation of personal computer)) that is capable of executing multiple functions including scanning and printing, and has a device name "XXX." The MFP 100 comprises an operation unit 112, a display unit 114, a print executing unit 116, a scan executing unit 118, a network interface 120, a media insertion unit 122, and a controller 130. Those 112 to 130 are connected to a bus line (not denoted by numbers). Hereafter, the interface will be described as "I/F".

The operation unit 112 has a plurality of keys. A user can input various kinds of instructions to the MFP 100 by operating the operation unit 112. The display unit 114 is a display for displaying various kinds of information. The display unit 114 also functions as a so-called touch panel. That is, the display unit 114 also functions as an operation unit operated by the user. Hereafter, the operation unit 112 and an operation unit realized by the display unit 114 will be collectively referred to as an "operation unit 112". The print executing unit 116 is a printing mechanism such as ink jet method, laser method, etc. The scan executing unit 118 is a scan mechanism such as CCD, CIS, etc. The network I/F 120 is connected to the Internet 4 via an unillustrated LAN (abbreviation of Local Area Network). The media insertion unit 122 is a part into which a media such as a USB memory, a SD card, etc. is inserted.

The controller 130 comprises a CPU 132 and a memory 134. The CPU 132 is a processor that executes various kinds of processing in accordance with a program 136 stored in the memory 134. The memory 134 is constituted of RAM, ROM, etc.

The memory 134 stores, in addition to the program 136, a scan profile 138 and a copy profile 140. The scan profile 138 is a color conversion profile for converting scan data expressed by an RGB color space to scan data expressed by a sRGB (abbreviation of standard RGB) color space.

The scan profile 138 may be a grid type profile in which a plurality of coordinate values by the RGB color space (e.g., $17^3$ grid points) are associated with a plurality of coordinate values by the sRGB color space, or may be a function type profile indicating a function for converting the coordinate values by the RGB color space to the coordinate values by the sRGB color space. The other profile 140, etc. may also be either of a grid type profile and a function type profile. The RGB color space is a color space that expresses scan data generated by the scan executing unit 118, that is, is dependent in properties of the scan executing unit 118. The sRGB color space is a color space conforming to a standard defined by the IEC (International Electrotechnical Commission). The sRGB color space is generally a color space that expresses scan data saved in a destination apparatus designated by the user (hereinafter referred to as "saving target data"), and is suitable for saving scan data.

The copy profile 140 is a color conversion profile for converting scan data expressed by the RGB color space to scan data expressed by an Adobe RGB color space. The Adobe RGB color space is a color space conforming to a standard defined by Adobe (registered trademark) Systems Incorporated. The Adobe RGB color space is a color space that generally expresses scan data printed for copying a document (hereinafter, referred to as "copy target data"), and is suitable for printing the scan data (i.e., copying).

(Configuration of Control Server 200)

The control server 200 is a server disposed on the Internet 4 by a vendor of the MFP 100. The control server 200 can realize a scan saving process that saves the saving target data in the destination apparatus and a copying process using the copy target data by controlling the MFP 100. The control server 200 comprises a network I/F 220 and a controller 230. The network I/F 220 is connected to the Internet 4.

The controller 230 comprises a CPU 232 and a memory 234. The CPU 232 is a processor that executes various kinds of processing in accordance with a program 236 stored in the memory 234. The memory 234 is constituted of a RAM, a ROM, etc.

The memory 234 stores, in addition to the program 236, an account (hereinafter, referred to as "AC (abbreviation of Account)") table TB1, and a mail table TB2. In the AC table TB1, information related to a service providing server (e.g. the saving server 400) that provides various kinds of services is registered. Specifically, a device name, a server name, an AC name, and an access token (hereinafter "AT (abbreviation of Access Token)") are registered in association in the AC table TB1. The device name is a name of an apparatus (e.g., the MFP 100) controlled by the control server 200. In FIG. 1, in the AC table TB1, the device name "XXX" of the MFP 100 is the only entry registered therein, but a different device name may additionally be registered. The server name is a server name of the service providing server. In FIG. 1, in the AC table TB1, a server name "SN" of the saving server 400 only is registered, but a different server name other than the server name "SN" may additionally be registered. The AC name and the AT are authentication information necessary for executing communication with the service providing server. Hereinafter, a method that allows a user corresponding to an AC1 to register information related to the saving server 400 (i.e., "XXX", "SN", "AC1", and "AT1") in the AC table TB1 will be described.

The user firstly uses a communication apparatus such as PC, smartphone, etc. to register account information including the AC1 in the saving server 400. Thereafter, the user uses the communication apparatus to access the control server 200, and obtains a URL (abbreviation of Uniform Resource Locator) for accessing the saving server 400 from the control server 200. Then, the user accesses the saving server 400 from the communication apparatus by using the URL, and inputs the account information to the saving server 400 for authentication procedure. When the authentication is successful, the saving server 400 generates an AT1 corresponding to the account information, and provides the AT1 to the control server 200. When obtaining the AT1 from the saving server 400, the control server 200 generates a temporary ID corresponding to the AT1, and provides the temporary ID to the communication apparatus. As a result of this, the temporary ID is displayed in the communication apparatus.

Then, the user operates the operation unit 112 of the MFP 100, and inputs the server name "SN", the AC1, and the temporary ID to the MFP 100. In this case, the MFP 100 provides the device name "XXX", the server name "SN", the AC1, and the temporary ID to the control server 200. As a result of this, the control server 200 identifies the AT1 corresponding to the temporary ID obtained from the MFP 100, and registers other information obtained from the MFP 100 (i.e., the device name "XXX", the server name "SN", and the AC1) in association with the AT1 in the AC table TB1. Also, the control server 200 provides the AT1 to the MFP 100. As a result of this, the AC1 and the AT1 are stored in association with each other in the memory 134 of the MFP 100.

Information related to email is registered in the mail table TB2. Specifically, in the mail table TB2, the device name, a sending target, and an email address are registered in association with each other. The sending target is a name of a user to whom the email address is allocated. In the mail table TB2, the respective information is registered in a following method. That is, the user operates the operation unit 112 of the MFP 100 and inputs the sending target "D1" and the email address "MA1" to the MFP 100. In this case, the MFP 100 provides the device name "XXX" of the MFP 100, the sending target "D1", and the email address "MA1" to the control server 200. As a result of this, the control server 200 registers these pieces of information in association with each other in the mail table TB2.

(Configuration of Conversion Server 300)

The conversion server 300 is disposed on the Internet 4 by the vendor of the MFP 100. The conversion server 300 is capable of executing a file format conversion process for converting a file format of scan data. Further, the conversion server 300 is capable of executing a color conversion process using a specific profile 310. The specific profile 310 is a color conversion profile for converting scan data expressed by the Adobe RGB color space to scan data expressed by the sRGB color space.

(Configuration of Saving Server 400)

The saving server 400 is a known third party server, for example, "Evernote (registered trademark)", "Google (registered trademark) Docs", "PICASA (registered trademark)", "FACEBOOK (registered trademark)". The saving server 400 is capable of saving various kinds of data including scan data, etc.

(Configuration of Mail Server 500)

The mail server 500 is a known mail server disposed on the Internet. The mail server 500 comprises a plurality of mail boxes associated with a plurality of mail addresses. The mail server 500, when receiving an email for which a specific mail address is designated as its sending target, saves the email in the mail box associated with the specific mail address.

Figure 2:
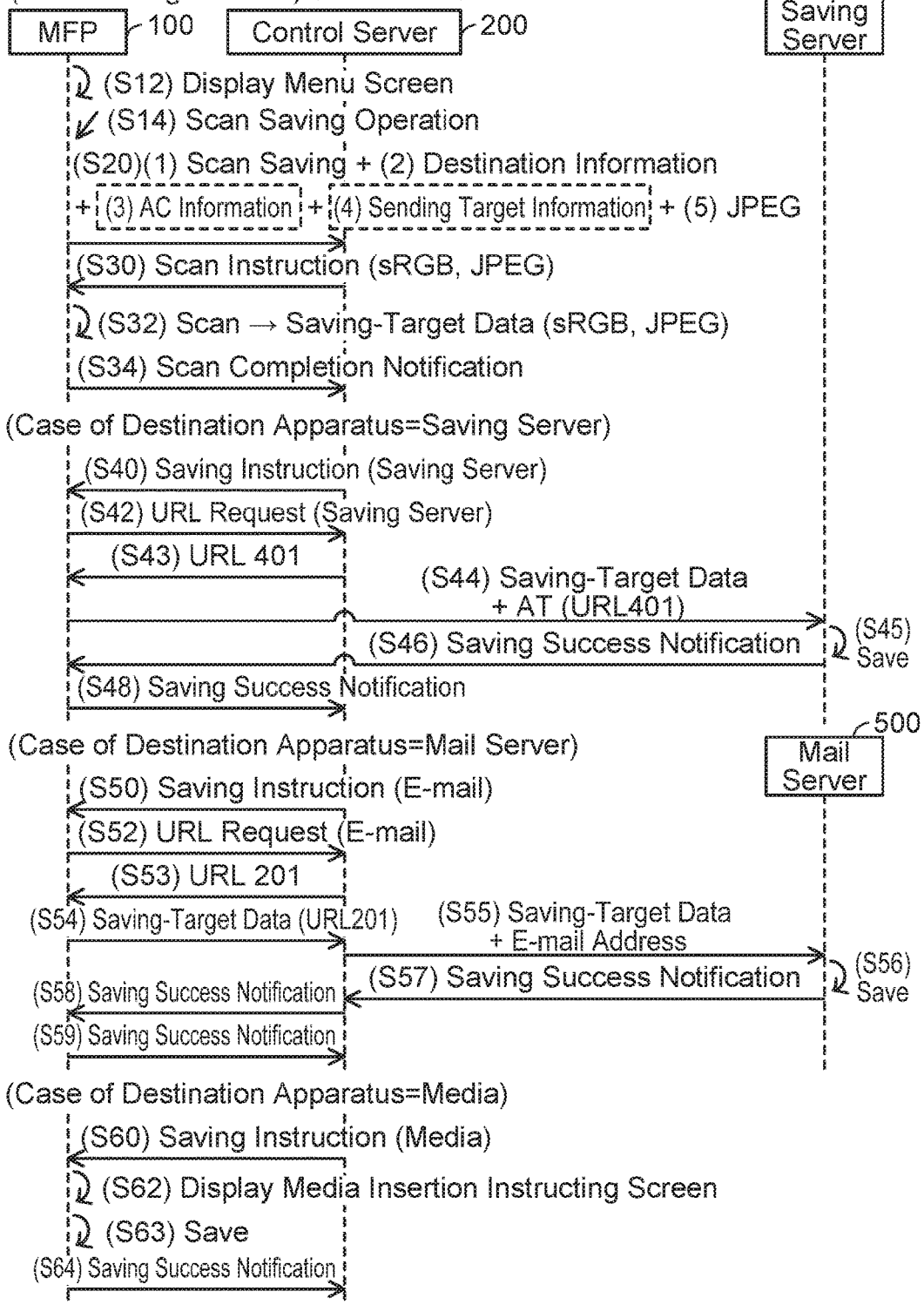
FIG. 2 illustrates a sequence diagram of a scan saving process in a case where JPEG is selected.
Figure 3:
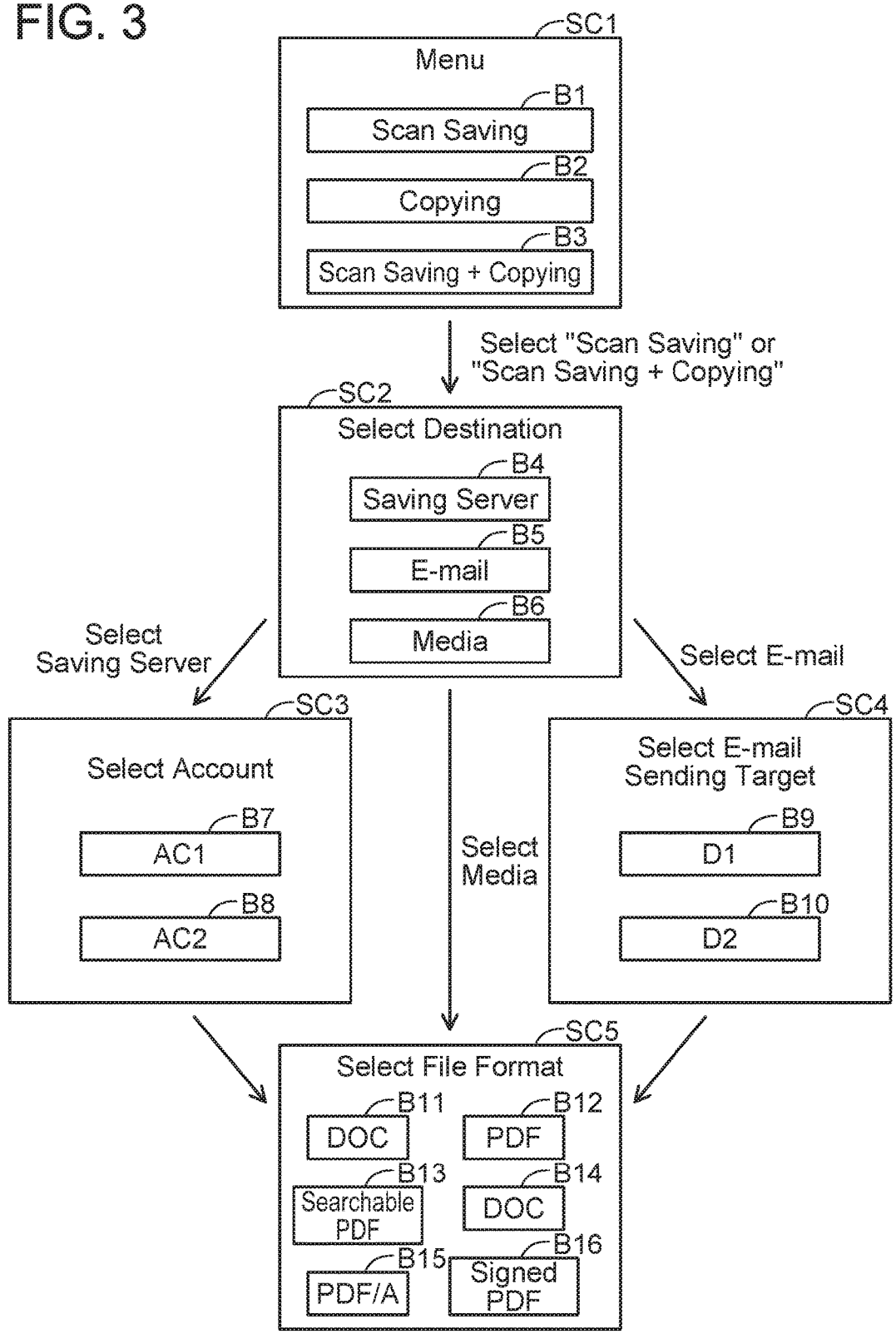
FIG. 3 illustrates screens displayed on a multifunction peripheral.

(Scan Preservation Process; FIGS. 2 to 4)

Next, with reference to FIGS. 2 to 4, the scan saving process realized by the control server 200 will be described. The scan saving process in FIG. 2 is executed in a case where an operation for instructing execution of only the scan saving process among the scan saving process and the copying process is accepted by the MFP 100. Notably, in each of the following processes, each of the MFP 100 and the control server 200 executes various kinds of communication using the network I/F 120 (or 220). However, hereinafter, a description "via the network I/F 120 (or 220)" will be omitted.

In S12, the CPU 132 of the MFP 100 causes the display unit 114 to display a menu screen SC1 of FIG. 3 in response to power of the MFP 100 being turned on. The menu screen SC1 includes a plurality of buttons B1 to B3. The button B1 is a button for executing the scan saving process only. The button B2 is a button for executing the copying process only. The button B3 is a button for executing both of the scan saving process and the copying process.

In S14 of FIG. 2, the user performs an operation that selects the button B1 on the MFP 100. Due to this, the CPU 132 accepts an instruction indicating the execution of the scan saving process.

In S20, the CPU 132 firstly sends operation information indicating that the scan saving operation has been accepted by the MFP 100 to the control server 200 (see (1) in S20). Here, the operation information includes the device name "XXX" of the MFP 100, and the device name "XXX" can be notified to the control server 200.

When receiving the operation information indicating the scan saving process from the MFP 100, the CPU 232 generates destination selection screen information representing a destination selection screen SC2 (see FIG. 3) for selecting a destination apparatus being an apparatus in which the saving target data is to be saved, and sends the screen information to the MFP 100.

The CPU 132, when receiving the destination selection screen information from the control server 200, causes the display unit 114 to display the destination selection screen SC2 indicated by the screen information. The destination selection screen SC2 includes a plurality of buttons B4 to B6. The button B4 is a button for saving the scan data in the saving server 400. The button B5 is a button for sending an email including the scan data. That is, in this case, the mail server 500 is the destination apparatus in which the scan data is to be saved. The button B6 is a button for saving the scan data in a media inserted into the media insertion unit 122. The CPU 132, when accepting an operation for selecting one of the buttons B4 to B6, sends the destination information indicating the destination corresponding to the selected button to the control server 200 (see (2) in S20).

The CPU 232, when receiving the destination information indicating the saving server 400 for example, although not illustrated, generates AC selection screen information representing an AC selection screen SC3 (see FIG. 3) using the AC1 and an AC2 registered in the AC table TB1 in association with the device name "XXX", and sends the screen information to the MFP 100.

The CPU 132, when receiving the AC selection screen information from the control server 200, causes the display unit 114 to display the AC selection screen SC3 represented by the screen information. The AC selection screen SC3 includes a plurality of buttons B7 and B8 indicating the AC1 and the AC2. The CPU 132, when accepting an operation that selects one of the buttons of B7 and B8, sends AC information indicating the AC name corresponding to the selected button to the control server 200 (see (3) in S20).

Further, the CPU 232, when receiving the destination information indicating the mail server 500 for example, although not illustrated, generates sending target selection screen information representing a sending target selection screen SC4 (see FIG. 3) for selecting a sending target of the email using MA1 and MA2 that are registered in the mail table TB2 in association with the device name "XXX", and sends the screen information to the MFP 100.

The CPU 132, when receiving the sending target selection screen information from the control server 200, causes the display unit 114 to display the sending target selection screen SC4 represented by the screen information. The sending target selection screen SC 4 includes a plurality of buttons B9 and B10 indicating D1 and D2. When the user selects one of the buttons B9 and B10, the CPU 132 sends the sending target information indicating the sending target corresponding to the selected button to the control server 200 (see (4) in S20).

The CPU 232, in case of receiving the AC information from the MFP 100 (see S20 (3)), in case of receiving the sending target information from the MFP 100 (see S20 (4)), or in case of receiving the destination information indicating the media (see S20 (2)), although not illustrated, generates format selection screen information representing a format selection screen SC5 (see FIG. 3) for selecting a file format of the saving target data, and sends the screen information to the MFP 100.

When receiving the format selection screen information from the control server 200, the CPU 132 causes the display unit 114 to display the format selection screen SC 5 represented by the screen information. The format selection screen SC5 includes a plurality of buttons B11 to B16 indicating a plurality of file formats. The plurality of file formats includes JPEG (abbreviation of Joint Photographic Experts Group), PDF (abbreviation of Portable Document Format), Searchable PDF, DOC (abbreviation of Document), PDF/A, and Signed PDF. The CPU 132, when the user selects one of the buttons B11 to B16, sends format information indicating the file format corresponding to the selected button to the control server 200 (see (5) in S20). In case of FIG. 2, as the button B11 indicating JPEG is selected, the format information indicates JPEG. Notably, in the plurality of file formats, JPEG, PDF, PDF/A, and Signed PDF are file formats the MFP 100 is capable of generating, and Searchable PDF and DOC are file formats that the MFP 100 are incapable of generating.

In the present embodiment, the format selection screen SC5 has a style by which any of the buttons B11 to B16 are selectable, but in a modification, it may have a style by which some of the buttons B11 to B16 are not selectable. For example, in a case where the button B4 indicating the saving server 400 is selected when Searchable PDF cannot be saved by the saving server 400, the button B13 indicating Searchable PDF may not be displayed. Alternatively, in another modification, the CPU 132 may cause the display unit 114 to further display a screen for selecting scan settings such as a scan resolution, etc.

The CPU 232, when receiving the format information from the MFP 100 sends a scan instruction for causing the MFP 100 to execute a process of generating the scan data in S30. The scan instruction includes information indicating sRGB as the color space of the scan data and information indicating JPEG which is the format information in S20 as the file format of the scan data.

When receiving the scan instruction from the control server 200, in S32, the CPU 132 causes the scan executing unit 118 to execute scanning of the document, and causes the scan executing unit 118 to generate scan data expressed by the RGB color space. Next, the CPU 132 converts the scan data expressed by the RGB color space to scan data expressed by the sRGB color space using the scan profile 138. Then, the CPU 132 adds header information, etc. corresponding to JPEG to the converted scan data, and generates saving target data the file format of which is JPEG and expressed by sRGB color space. Alternatively, in a modification, the scan executing unit 118 may be capable of generating scan data expressed by the sRGB color space and scan data expressed by the Adobe RGB color space. Hereinafter, the aforementioned data may be expressed together with the color space that expresses the data and the file format that the data has. For example, the saving target data generated in S32 is expressed as the saving target data (sRGB, JPEG). In S34, the CPU 132 sends a scan completion notification indicating completion of the scan execution to the control server 200.

The CPU 232 executes following processes according to the destination apparatus when receiving the scan completion notification from the MFP 100. In a case where the button B4 of FIG. 3 is selected (i.e., destination apparatus is the saving server), the CPU 232 sends in S40 a saving instruction to the MFP 100. The saving instruction in S40 includes information indicating that the destination apparatus is the saving server 400 (i.e., includes the server name "SN" of the saving server 400).

When receiving the saving instruction of S40 from the control server 200, the CPU 132 sends a URL request to the control server 200 in S42. The URL request of S42 includes the server name "SN" of the saving server 400.

When receiving the URL request of S42 from the MFP 100, the CPU 232 sends a URL 401 of the saving server 400 to the MFP 100 in S43.

When receiving the URL 401 from the control server 200, the CPU 132 obtains from the memory 134 an AT stored in the memory 134 in association with the AC name selected in the AC selection screen SC3 (see FIG. 3). Then, the CPU 132 sends the saving target data and the AT by setting the URL 401 as the sending target.

When receiving the saving target data and the AT from the MFP 100, the saving server 400 saves the saving target data in association with the AC name corresponding to the AT in S45, and in S46 it sends a saving success notification indicating that the saving of the saving target data has been successful to the MFP 100.

When receiving the saving success notification from the saving server 400, the CPU 132 sends the saving success notification to the control server 200 in S48. This completes the scan saving process for saving the saving target data (sRGB, JPEG) in the saving server 400.

Further, for example, in a case where the button B5 of FIG. 3 is selected (i.e., destination apparatus=the mail server), the CPU 232 sends a saving instruction to the MFP 100 in S50. The saving instruction of S50 includes information indicating that the destination apparatus is the mail server 500.

When receiving the saving instruction of S50 from the control server 200, the CPU 132 sends a URL request in S52. The URL request of S52 includes information indicating that the destination apparatus is the mail server 500.

When receiving the URL request of S52 from the MFP 100, the CPU 232 obtains a URL 201 (not illustrated in FIG. 1) indicating a mail sending function in the control server 200 from the memory 234. Then, the CPU 232 sends the URL 201 to the MFP 100 in S53.

When receiving the URL 201 from the control server 200, the CPU 132 sends the saving target data, setting the URL 201 as the sending target in S54.

When receiving the saving target data from the MFP 100, the CPU 232 executes a process for sending an email including the saving target data in S55. Specifically, the CPU 232, as the sending target information indicating the sending target of the email (i.e., D1 or D2) has been received (see the sending target selection screen SC4 in FIG. 3), identifies the email address (i.e., MA1 or MA2) registered in the mail table TB2 in association with the sending target. Then, the CPU 232 sends an email including the saving target data to the mail server 500, setting the identified email address as the sending target.

When receiving the email from the control server 200, the mail server 500 saves the email in the mail box corresponding to the mail address being the sending target in S56, and in S57 sends the saving success notification to the control server 200.

When receiving the saving success notification from the mail server 500, the CPU 232 sends the saving success notification to the MFP 100 in S58.

When receiving the saving success notification from the control server 200, the CPU 132 sends the saving success notification to the control server 200 in S59. This completes the scan saving process for saving the saving target data (sRGB, JEPG) in the mail server 500. The user can receive the above email by using a communication apparatus such as PC and accessing the mail server 500, and as a result of this, the user can obtain the saving target data.

In a case where the button B6 of FIG. 3 is selected (i.e., destination apparatus is the media), the CPU 232 sends in S60 a saving instruction to the MFP 100. The saving instruction of S60 includes information indicating that the destination apparatus is the media.

When receiving the saving instruction of S60 from the control server 200, the CPU 132 causes the display unit 114 to display a media insertion instruction screen in S62. The media insertion instruction screen includes a message suggesting that the media be inserted into the media insertion unit 122. Then, the CPU 132 saves the saving target data in the media in S63, and in S64, it sends the saving success notification to the control server 200. This completes the scan saving process for saving the saving target data (sRGB, JPEG) in the media.

The scan saving process of FIG. 4 is different from the case of FIG. 2 in that in the format selection screen SC5 of FIG. 3 Searchable PDF is selected. If the same processes and operations as S12 to S14 of FIG. 2 are performed, in S120, the CPU 132 sequentially sends the operation information, the destination information, and the format information, etc. to the control server 200 similar to S20 of FIG. 2. In the case of FIG. 4, the format information indicates Searchable PDF (see (5) in S120).

S130 and S132 are the same as S30 and S32 of FIG. 2. However, the file format of the scan data generated in S132 is not Searchable PDF but JPEG. This is because the MFP 100 is incapable of generating scan data in Searchable PDF. Alternatively, in a modification, the file format of the scan data generated in S132 may be different from JPEG, and may be a file format that the MFP 100 is capable of generating (for example, PDF).

In S133, the CPU 132 sends a URL request to the control server 200. The URL request of S133 includes information indicating requesting for a URL of a storage target of the scan data (i.e., of the conversion server 300).

When receiving the URL request from the MFP 100, in S134, the CPU 232 sends an ID request to the conversion server 300. The ID request is a command for requesting for an ID identifying a location in which the scan data should be stored.

When receiving the ID request from the control server 200, the conversion server 300 sends the ID to the control server 200 in S135.

When receiving the ID from the conversion server 300, the CPU 232 obtains a URL of the conversion server 300 from the memory 234 and generates a URL 301 by combining the URL and the ID. In S136, the CPU 232 sends a sending instruction including the URL 301 to the MFP 100.

When receiving the sending instruction from the control server 200, the CPU 132 sends a storage request to the conversion server 300 in S138 by setting the URL 301 in the sending instruction as the sending target. The storage request includes the scan data generated in S132 (sRGB, JPEG).

When receiving the storage request from the MFP 100, the conversion server 300 stores the scan data (sRGB, JPEG) in the location indicated by the ID in the URL 301 in S140, and in S141 it sends a storage success notification to the MFP 100.

When receiving the storage success notification from the conversion server 300, the CPU 132 sends the storage success notification to the control server 200 in S142.

When receiving the storage success notification from the MFP 100, the CPU 232 sends a conversion instruction for converting the scan data (sRGB, JPEG) to the conversion server 300 in S146. The conversion instruction includes information indicating that the file format should be converted into Searchable PDF.

When receiving the conversion instruction from the control server 200, the conversion server 300 converts the scan data (sRGB, JPEG) in accordance with the conversion instruction, generates saving target data (sRGB, Searchable PDF), and stores the saving target data (sRGB, Searchable PDF) at the location indicated by the afore mentioned ID in S147. Then, in S148, the conversion server 300 sends a conversion success notification indicating that the conversion of the scan data has been successful to the control server 200.

As mentioned above, in a case where a file format the MFP 100 is incapable of generating is selected by the user, the file format conversion process is executed in the conversion server 300. On the other hand, as shown in FIG. 2, in a case where a file format that the MFP 100 is capable of generating is selected by the user, the file format conversion process is not executed in the conversion server 300. A table in FIG. 5 shows relations between file formats selected by the user and availability of the execution of the file format conversion process in the conversion server 300. The file format conversion process is executed in a case where either of Searchable PDF or DOC is selected, whereas it is not executed in a case where any of JPEG, PDF, PDF/A and Signed PDF is selected. The CPU 232 executes the following processes according to the destination apparatus when receiving the conversion success notification from the conversion server 300. If the destination apparatus is the saving server, the CPU 232 sends a saving target data request for requesting for a sending of the saving target data to the conversion server 300 in S150, and in S152, it receives the saving target data from the conversion server 300. Then, the CPU 232 obtains the AT that is registered in AC table TB1 in association with the AC name indicated by the AC information received in S120 (see S20 (3) in FIG. 2). Then, the CPU 232 sends the saving target data and the AT in the saving server 400 in S154.

The saving server 400, when receiving the saving target data and the AT from the control server 200, saves in S157 the saving target data in association with the AC name corresponding to the AT, and sends in S158 the saving success notification to the control server 200. This completes the scan saving process for saving the saving target data (sRGB, Searchable PDF) in the saving server 400.

Further, S160, S162 that are executed if the destination apparatus is the mail server are respectively the same as S150, S152. S165 to S169 are respectively the same as S55 to S59 in FIG. 2. This completes the scan saving process for saving the saving target data (sRGB, Searchable PDF) in the mail server 500.

Further, S170, S172 that are executed if the destination apparatus is the media are respectively the same as S60, S62 in FIG. 2. When the media is inserted into the media insertion unit 122, the CPU 132 sends the saving target data request to the conversion server 300 in S174 by setting the URL 301 as the sending target, and receives the saving target data from the conversion server 300 in S176. S178, S180 are respectively the same as S63, S64 in FIG. 2. This completes the scan saving process for saving the saving target data (sRGB, Searchable PDF) in the media.

Notably, the scan saving process of a case where a different file format than JPEG and Searchable PDF is selected is as follows. In a case where the file format that the MFP 100 is capable of generating (i.e., one of PDF, PDF/A, and Signed PDF) is selected, the scan saving process same as FIG. 2 is executed. In a case where the file format that the MFP 100 is incapable of generating (i.e., one of Searchable PDF and DOC) is selected, the scan saving process same as FIG. 4 is executed.

(Copying Process; FIG. 6)

Subsequently, with reference to FIG. 6, the copying process realized by the control server 200 will be described. The copying process of FIG. 6 is executed in a case where an operation for instructing the execution of the copying process only among the scan saving process and the copying process is accepted at the MFP 100.

S212 is the same as S12 of FIG. 2. On the MFP 100, the user executes a copying operation that selects the button B2 in the menu screen SC1 of FIG. 3 in S214. Due to this, the CPU 132 accepts the copying operation. In S220, the CPU 132 sends operation information indicating a copying to the control server 200.

When receiving the operation information indicating the copying from the MFP 100, the CPU 232 generates editing screen information representing an editing screen SC6, and sends the screen information to the MFP 100. The editing screen SC 6 is a screen for selecting an editing content of the scan data.

When receiving the editing screen information from the control server 200, the CPU 132 causes the display unit 114 to display the editing screen SC6 indicated by the screen information. The editing screen SC6 includes a plurality of buttons B17, B18 indicating a plurality of types of editing and a button B19 indicating that the editing is not to be executed. A first editing is, for example, a process that combines data representing a character string designated by the user into the scan data. A second editing is a process for executing corrections of the scan data (e.g., adjustment of white balance, adjustment of colors, etc.).

In S225, the user performs a selection operation that selects one of B17 to B19. In a case where the user selects the button B17 or B18, the user further performs a selection operation that selects a degree of the adjustment. In S226, the CPU 132 sends an operation completion notification indicating a content of the selection operation to the control server 200.

The CPU 232, when receiving the operation completion notification from the MFP 100, sends in S240 a scan instruction to the MFP 100. The scan instruction of S240 includes information indicating Adobe RGB as the color space for the scan data, and information indicating JPEG as the file format of the scan data. Since no file format is selected by the user in the copying process, the scan instruction may include information indicating any of the file formats that the MFP 100 is capable of generating. Therefore, in a modification, the scan instruction may include information indicating PDF for example.

When receiving the scan instruction from the control server 200, the CPU 132 causes the scan executing unit 118 to execute a scanning of the document, and generates scan data (Adobe RGB, JPEG) in S242.

S250 to S262 are respectively the same as S133 to S136 in FIG. 4. However, as the ID of S254 is different from the ID of S135 in FIG. 4, the sending instruction of S262 includes a URL 302 different from the URL 301. In S270, the CPU 132 sends a storage request to the conversion server 300, setting the URL 302 as the sending target. The storage request includes the scan data (Adobe RGB, JPEG), and editing information indicating the content selected in the editing screen SC6.

The conversion server 300, when receiving the storage request from the MFP 100, executes in S284 editing of the scan data (Adobe RGB, JPEG) based on the editing information included in the storage request. Due to this, copy target data which is the edited scan data (Adobe RGB, JPEG) is generated. In S286, the conversion server 300 stores the copy target data (Adobe RGB, JPEG) therein. Notably, in a case where the editing information indicates that editing is not to be executed, the conversion server 300 stores the scan data (Adobe RGB, JPEG) as it is as the copy target data without executing S284.

S288, S289 are respectively the same as S141, S142 of FIG. 4. In S290, the CPU 232 sends a printing instruction to the MFP 100. Specifically, the printing instruction is an instruction for causing the MFP 100 to execute a process of receiving the copy target data from the conversion server 300 and a process of printing an image represented by the copy target data.

The CPU 132, when receiving the printing instruction from the control server 200, sends in S292 a copy target data request to the conversion server 300, setting the URL 302 as the sending target, and receives in S294 the copy target data (Adobe RGB, JPEG) from the conversion server 300. Then, the CPU 132 in S296 causes the print executing unit 116 to execute the printing of the image represented by the copy target data (Adobe RGB, JPEG). Specifically, the CPU 132 converts the copy target data into multitone CMYK data, and generates print data having relatively fewer tones (e.g., two-tone) by executing a halftone process to the multitone CMYK data, and provides the print data to the print executing unit 116. Due to this, the print executing unit 116 executes the printing of an image represented by the print data. As a result of this, the copying process is realized.

As mentioned above, the MFP 100 does not print the scan data as it is, but sends the scan data to the control server 200 and receives the copy target data from the conversion server 300. Thus, since the MFP 100 executes a copying using the conversion server 300, the MFP 100 can execute copying using the edited copy target data.

(Scan Saving Process and Copying Process; FIGS. 7 to 10)

Subsequently, in reference to FIGS. 7 to 10, a dual process realized by the control server 200 will be described. The dual process means both of the scan saving process and the copying process and is executed in a case where an operation for executing the dual process is accepted at the MFP 100.

Figure 7:
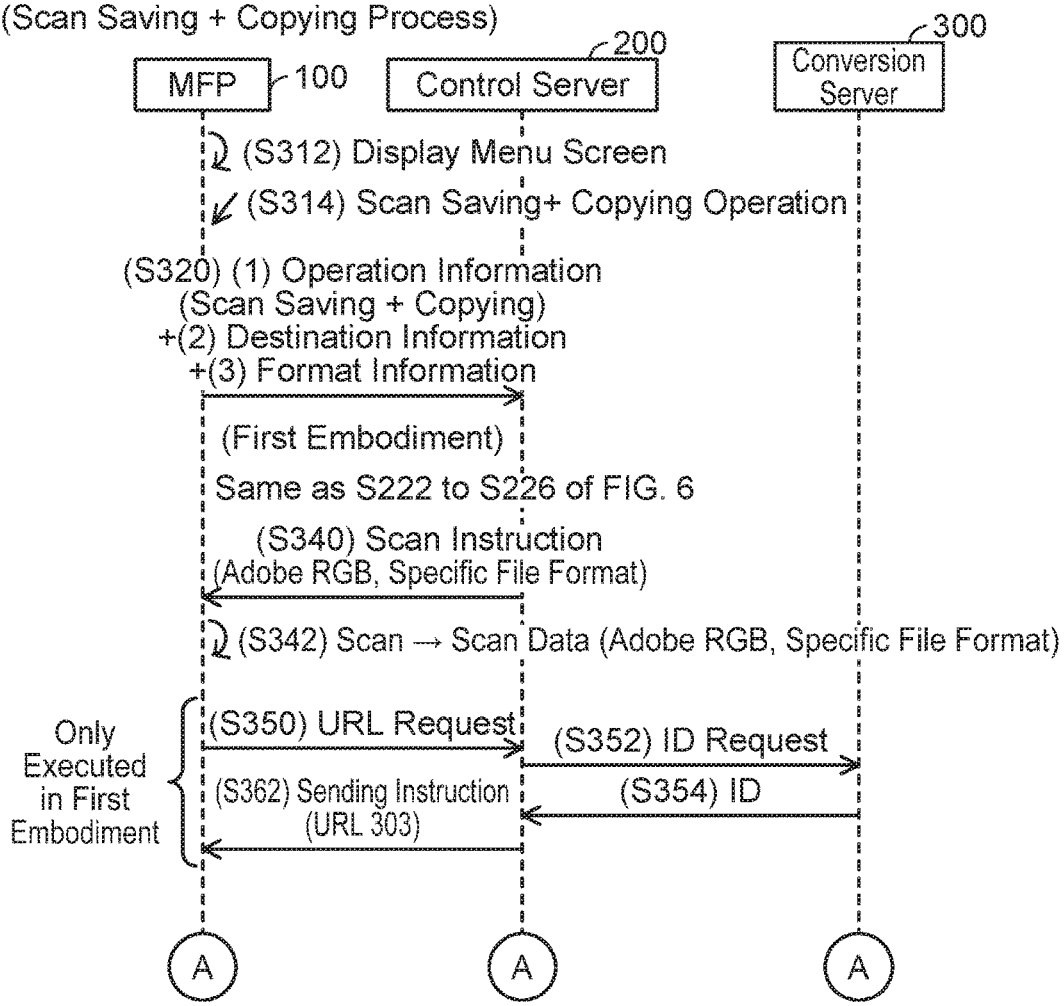
FIG. 7 illustrates a sequence diagram in a case where the scan saving process and the copying process are simultaneously executed.

S312 of FIG. 7 is the same as S12 of FIG. 2. In S314, in the menu screen SC1 of FIG. 3, an operation that selects the button B3 indicating scan saving and copying is performed to the MFP 100. Due to this, the CPU 132 accepts both of the scan saving operation and the copying operation.

S320 is the same as S20 of FIG. 2 and S120 of FIG. 4. Subsequently, processes the same as S222 to S226 of FIG. 6 are executed. That is, the user selects information related to the copying process in the editing screen SC6 of FIG. 6 after selecting information related to the scan saving process in the screens SC2 to SC5 of FIG. 3.

In S340, the CPU 232 sends a scan instruction to the MFP 100. The scan instruction of S340 includes information indicating Adobe RGB as the color space for scan data and information indicating a specific file format as the file format for the scan data. In a case where the file format the MFP 100 is capable of generating (i.e., JPEG, PDF, PDF/A, or Signed PDF) is selected in the format selection screen SC5 of FIG. 3, the specific file format is the selected file format. Further, in a case where the file format the MFP 100 is incapable of generating (i.e., DOC or Searchable PDF) is selected, the specific file format is JPEG. Alternatively however, in a modification, the specific file format may be a different file format than JPEG, and may be a file format that the MFP 100 is capable of generating (e.g., PDF).

The CPU 132, when receiving the scan instruction from the control server 200, causes in S342 the scan executing unit 118 to execute the scanning of a document, and generates scan data (Adobe RGB, specific file format) having the above specific file format. S350 to S362 are respectively the same as S133 to S136 of FIG. 4. Notably, since the ID of S354 is different from the ID of S135 of FIG. 4, a sending instruction of S362 includes a URL 303 different from the URL 301.

Figure 8:
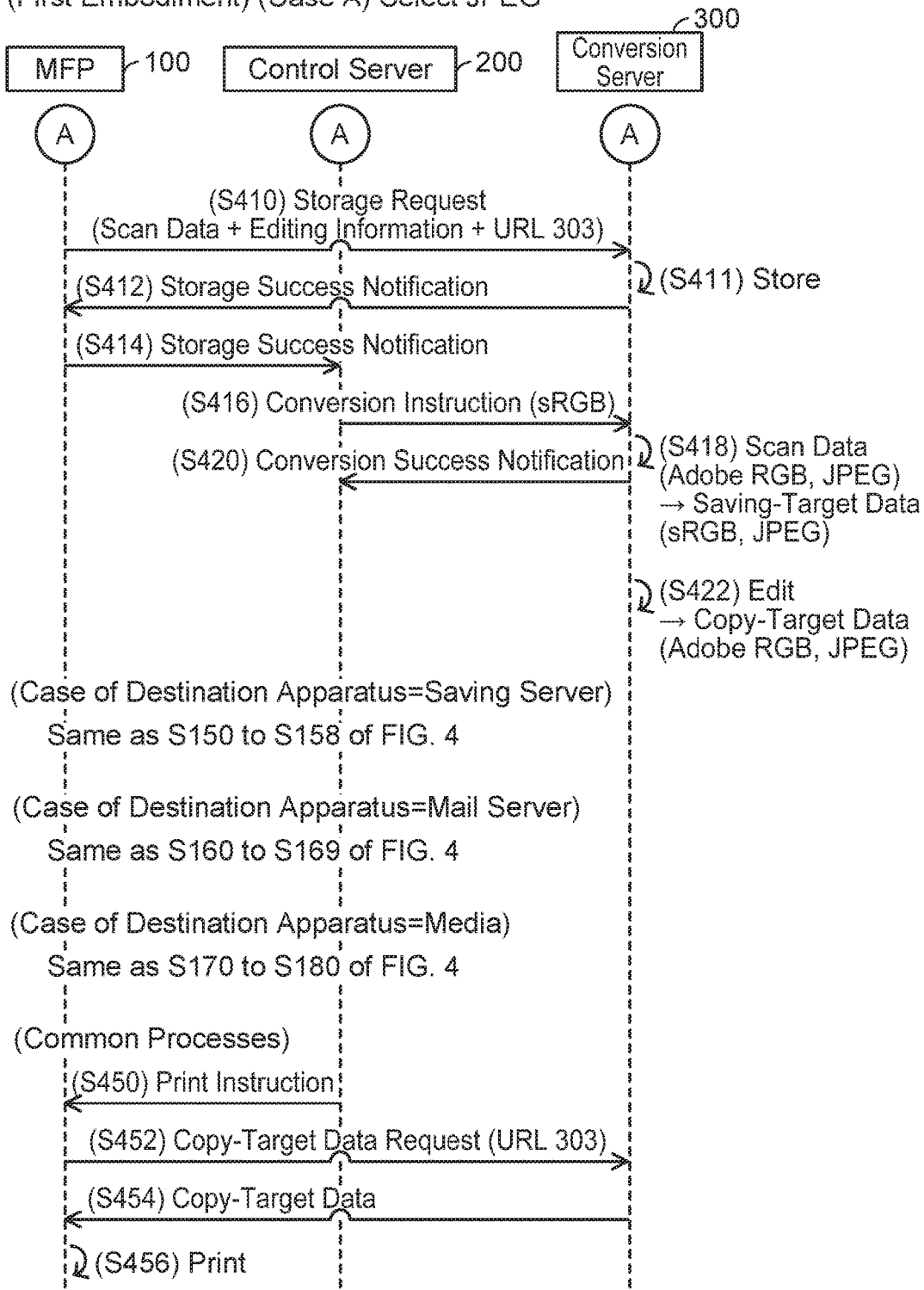
FIG. 8 illustrates a sequence diagram of Case A where JPEG is selected.

(Case A; FIG. 8)

Case A is a case where JPEG is selected in the format selection screen SC5 and the specific file format is JPEG. In S410, the CPU 132 sends a storage request including the scan data (Adobe RGB, JPEG) and editing information to the conversion server 300, setting the URL 303 as the sending target.

The conversion server 300, when receiving the storage request from the MFP 100, stores in S411 the scan data (Adobe RGB, JPEG) at a location indicated by the URL 303 included in the storage request. S412 and S414 are respectively the same as S141 and S142 of FIG. 4.

In S416, the CPU 232 sends, to the conversion server 300, a conversion instruction indicating that the color space of the scan data (Adobe RGB, JPEG) should be converted into sRGB.

The conversion server 300, when receiving the conversion instruction from the control server 200, first duplicates the scan data (Adobe RGB, JPEG). Then, the conversion server 300 executes a color conversion process using the specific profile 310 (hereinafter "specific color conversion process") to one of the two scan data (Adobe RGB, JPEG), and generates saving target data (sRGB, JPEG) in S418. S420 is the same as S148 of FIG. 4.

In S422, the conversion server 300 executes the editing of the other scan data among the two scan data (Adobe RGB, JPEG) based on the editing information included in the storage request of S410. Due to this, copy target data (Adobe RGB, JPEG), which is the edited scan data, is generated. Due to this, a state is created where the saving target data (sRGB, JPEG) and the copy target data (Adobe RGB, JPEG) are both stored in the conversion server 300.

In a case where the destination apparatus is the saving server, processes the same as S150 to S158 of FIG. 4 are executed. Further, in a case where the destination apparatus is the mail server, processes the same as S160 to S169 of FIG. 4 are executed. Further, in a case where the destination apparatus is the media, processes the same as S170 to S180 of FIG. 4 are executed. Due to this, the CPU 232 terminates the scan saving process for causing the destination apparatus (i.e., saving server 400, mail server 500, or media) to save the saving target data (sRGB, JPEG). Notably, whatever the destination apparatus is, the control server 200 executes a copying process, which will be described later, after receiving the saving success notification. If the saving of the saving target data has failed, the control server 200 does not receive the saving success notification, and thus it does not execute the copying process. Due to this, a situation where the copying process is executed despite the fact that the saving of the saving target data has failed can be prevented from taking place. That is, the control server 200 can suppress the user from getting confused on whether the scan saving process and the copying process have been respectively executed or not. Notably, the control server 200 may be configured to execute the saving of the saving target data after executing the copying process (to be described later), and also may be configured to execute the copying process (to be described later) and the saving of the saving target data in parallel.

Whatever the destination apparatus is, processes of S450 to S456 are executed. S450 is the same as S290 of FIG. 6. In S452, the CPU 132 sends the copy target data request to the conversion server 300, setting the URL 303 as the sending target, and in S454 the copy target data (Adobe RGB, JPEG) is sent from the conversion server 300 to the MFP 100. S456 is the same as S296 of FIG. 6. This completes the copying process.

(Effects of Case A)

In Case A, when receiving the operation information from the MFP 100 (S320 of FIG. 7), the control server 200 can send the scan instruction to the MFP 100 (S340), and cause the MFP 100 to execute the one-time scanning of a document image and generate the scan data (Adobe RGB, JPEG). Then, the control server 200 can realize the copying process that uses the conversion server 300, and uses the copy target data obtained using the scan data (Adobe RGB, JPEG), by sending the sending instruction and the printing instruction to the MFP 100 (S362, S450 of FIG. 8). Further, the control server 200 can realize the scan data saving process that uses the saving target data (sRGB, JPEG) obtained using the scan data (Adobe RGB, JPEG) (S150 to S154, S160 to S165, and S170 executed in FIG. 8). Due to this, the control server 200 can realize, in response to the operation for executing the dual process being accepted at the MFP 100, both of: the saving of the saving target data (sRGB, JPEG) representing the document image in the destination apparatus; and the copying of the document image, without causing the MFP 100 to execute plural times of scanning of the document image.

Further, in Case A, the saving target data (sRGB, JPEG) is generated by the specific color conversion process to the scan data (Adobe RGB, JPEG). Due to this, the control server 200 can realize both of: the saving of the saving target data expressed by the sRGB color space suitable for the saving of scan data; and the copying using the copy target data expressed by the Adobe RGB color space suitable for the printing of the scan data (i.e., copying).

A first configuration is assumed in which, different from Case A, scan data expressed by the sRGB color space is generated in S342 of FIG. 7, and the scan data is converted into scan data expressed by the Adobe RGB color space in S418 of FIG. 8. Effects of Case A that is advantageous over the first configuration will be described hereinbelow.

The color space (i.e., color range that can be expressed) of the Adobe RGB color space is broader than the color space of the sRGB color space. In the first configuration, it is necessary to execute an interpolation process for converting the scan data expressed by the smaller sRGB color space into the scan data expressed by the broader Adobe RGB color space. There may be a case where the execution of the interpolation process causes the color represented by the converted scan data to be different from the actual color of the document image. On the other hand, in Case A, since the interpolation process does not have to be executed, the likelihood of the color expressed by the converted scan data differing from the color of the document image can be lowered as compared to the first configuration. Alternatively, in a modification, the first configuration may be adopted. In this case, the sRGB color space is an example of "a first color space" and "a third color space". The Adobe RGB color space is an example of "a second color space". Further, in this case, "second scan data" is generated by the color conversion process to "first scan data".

Further, in Case A, the scan data expressed by the RGB color space is converted into the scan data expressed by the Adobe RGB color space (S342 of FIG. 7), and further, the scan data expressed by the Adobe RGB color space is converted into the scan data expressed by the sRGB color space (S418 of FIG. 8). On the other hand, a second configuration is assumed in which scan data expressed by the RGB color space is converted into scan data expressed in the Adobe RGB color space, and further, the scan data expressed by the RGB color space is converted into scan data expressed by the sRGB color space. In the second configuration, the MFP 100 needs to store the scan data expressed by the RGB color space in the memory 134 until both of the scan data expressed by the Adobe RGB color space and the scan data expressed by the sRGB color space have been generated. However, in Case A, once the scan data expressed in the Adobe RGB color space has been generated, the scan data expressed by the RGB color space may be deleted from the memory 134. That is, in Case A, load of the memory 134 may be reduced than in the second configuration.

Figure 9:
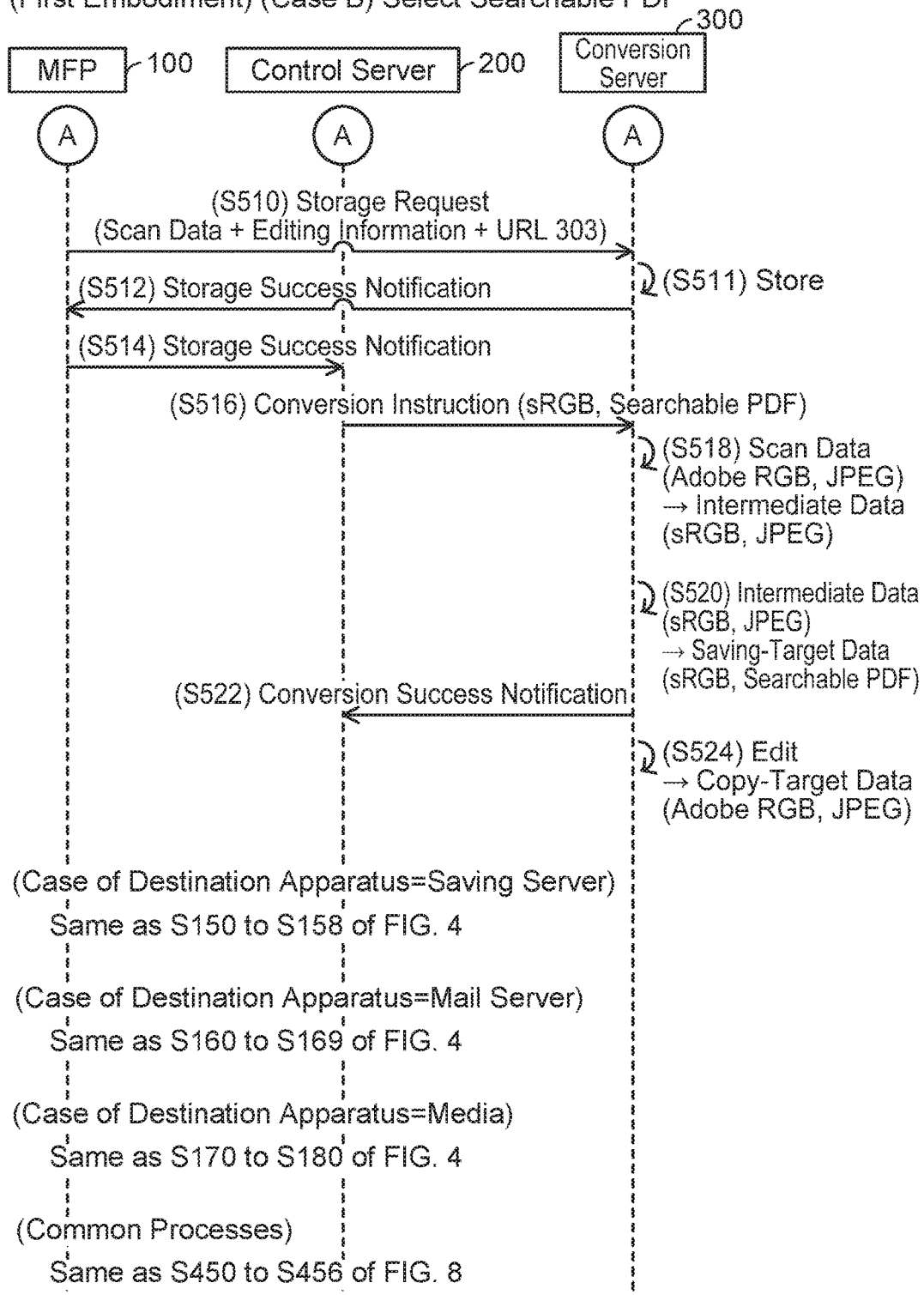
FIG. 9 illustrates a sequence diagram of Case B where Searchable PDF is selected.

(Case B; FIG. 9)

Case B is a case where Searchable PDF is selected in the format selection screen SC5, and the specific file format is JPEG. In S510, the CPU 132 sends a storage request including scan data (Adobe RGB, JPEG) and the editing information to the conversion server 300 by using the URL 303 as the sending target. S511 to S514 are respectively the same as S411 to S414 of FIG. 8.

In S516, the CPU 232 sends a conversion instruction indicating conversion of color space into the sRGB color space and conversion of file format to Searchable PDF to the conversion server 300.

When receiving the conversion instruction from the control server 200, the conversion server 300 duplicates the scan data (Adobe RGB, JPEG). In S518, the conversion server 300 executes the specific color conversion process to one of the two scan data (Adobe RGB, JPEG) in accordance with the conversion instruction, and generates intermediate data (sRGB, JPEG). In S520, the conversion server 300 executes the file format conversion process to the intermediate data (sRGB, JPEG), and generates saving target data (sRGB, Searchable PDF). S522 is the same as S148 of FIG. 4.

In S524, the conversion server 300 executes the editing of the other scan data among the two scan data (Adobe RGB, JPEG) based on the editing information included in the storage request of S510. Due to this, copy target data (Adobe RGB, JPEG), which is the edited scan data, is generated. Due to this, a state is created where both of the saving target data (sRGB, Searchable PDF) and the copy target data (Adobe RGB, JPEG) are stored in the conversion server 300.

In a case where the destination apparatus is the saving server, processes the same as S150 to S158 of FIG. 4 are executed. In the case where the destination apparatus is the mail server, processes the same as S160 to S169 of FIG. 4 are executed. In a case where the destination apparatus is the media, processes the same as S170 to S180 of FIG. 4 are executed. This completes the scan saving process where the CPU 232 causes the destination apparatus to save the saving target data (sRGB, Searchable PDF).

Whatever the destination apparatus is, processes the same as S450 to S456 of FIG. 8 are executed. This completes the copying process.

(Effects of Case B)

Case B also can bring forth the same effects as Case A. That is, the control server 200 can realize, in response to the operation for executing the dual process being accepted at the MFP 100, both of: the saving of the saving target data (sRGB, Searchable PDF) representing the document image; and the copying of the document image, without causing the MFP 100 to execute plural times of scanning of the document image. Further, in Case B, the control server 200 can cause the conversion server 300 to generate the saving target data having the file format that the MFP 100 is incapable of generating (i.e., Searchable PDF), by causing the conversion server 300 to execute the file format conversion process.

Figure 10:
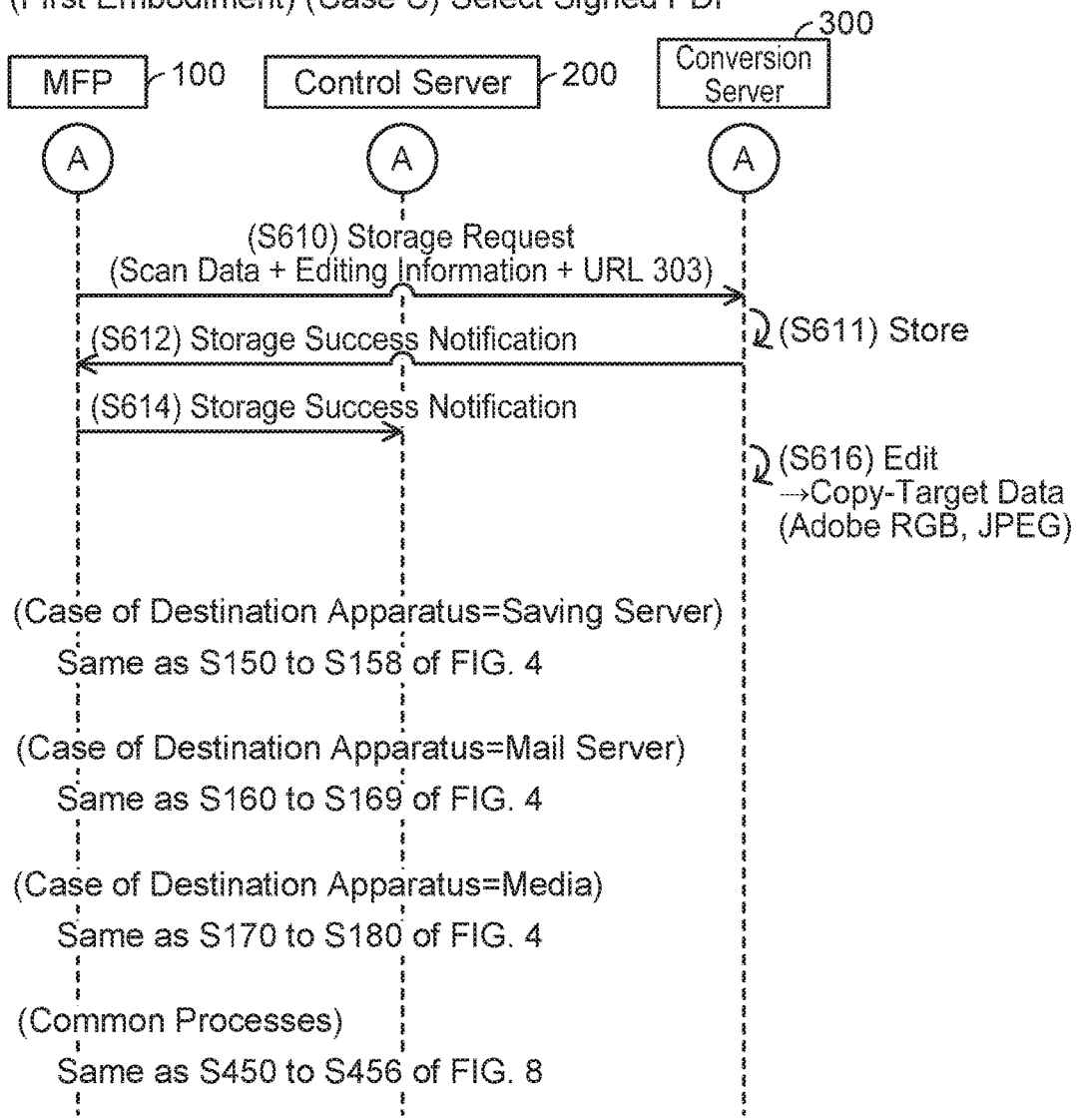
FIG. 10 illustrates a sequence diagram of Case C where Signed PDF is selected.

(Case C; FIG. 10)

Case C is a case where Signed PDF is selected in the format selection screen SC5, and the specific file format is Signed PDF. Since Signed PDF is selected, both of the specific color conversion process and the file format conversion process are not executed (see FIG. 5). Therefore, in the present case, the scan data (Adobe RGB, Signed PDF) generated in S342 of FIG. 7 is the saving target data. In S610, the CPU 132 sends a storage request including the saving target data (Adobe RGB, Signed PDF) and the editing information to the conversion server 300, setting the URL 303 as the sending target.

When receiving the storage request from the MFP 100, the conversion server 300 stores the saving target data (Adobe RGB, Signed PDF) at a location indicated by the URL 303 included in the storage request in S611. S612 and S614 are respectively the same as S141 and S142 of FIG. 4. As mentioned above, in the present case, since both of the specific color conversion process and the file format conversion process are not executed, the CPU 232 does not send the conversion instruction to the conversion server 300.

The conversion server 300 duplicates the saving target data (Adobe RGB, Signed PDF), and executes the editing of the other saving target data among the two saving target data (Adobe RGB, Signed PDF) based on the editing information included in the storage request in S616. Due to this, a state is created where the saving target data (Adobe RGB, Signed PDF) and the copy target data (Adobe RGB, Signed PDF) are both stored in the conversion server 300.

In the case where the destination apparatus is the saving server, processes the same as S150 to S158 of FIG. 4 are executed. In the case where the destination apparatus is the mail server, processes the same as S160 to S169 of FIG. 4 are executed. In the case where the destination apparatus is the media, processes the same as S170 to S180 of FIG. 4 are executed. Due to this, the scan saving process where the CPU 232 causes the destination apparatus to save the saving target data (Adobe RGB, Signed PDF).

(Effects of Case C)

Case C also can bring forth the same effects as Case A. That is, the control server 200 can realize, in response to the operation for executing the dual process being accepted at the MFP 100, both of: the saving of the saving target data (Adobe RGB, Signed PDF) representing the document image in the destination apparatus; and the copying of the document image, without causing the MFP 100 to execute plural times of scanning of the document image.

The specific color conversion process is executed in Cases A and B, but not executed in Case C. As the table of FIG. 5 shows, whether the specific color conversion process is executed or not depends on the file format indicated by the format information (i.e., file format selected in the format selection screen SC5). The specific color conversion process is executed in a case where JPEG, PDF, Searchable PDF, or DOC is selected. In the meantime, the specific color conversion process is not executed due to the following reason when PDF/A or Signed PDF is selected. The scan data in PDF/A and Signed PDF each include header information indicating the color space that expresses the scan data (Adobe RGB) (i.e., the color space is Adobe RGB). If the scan data (Adobe RGB) is color-converted into scan data (sRGB), the color space that expresses the color-converted scan data (sRGB) does not coincide with the color space indicated by the header information (i.e., Adobe RGB). In this case, with the scan data in Signed PDF, it may be possible that the scan data is regarded as having been falsified. Further, with the scan data in PDF/A, it might become impossible to appropriately output the scan data. To avoid the occurrence of such situations, the specific color conversion process is not executed when where PDF/A or Signed PDF is selected.

(Correspondence Relationship)

The MFP 100 and the conversion server 300 are examples of "a multifunction peripheral" and "a predetermined server", respectively. The operation for executing the dual process, the copying operation, and the scan saving operation are examples of "a first instruction", "a second instruction", and "a third instruction", respectively. The operation information and the saving success notification are examples of "instruction information" and "a notification", respectively. The scan data generated in S342 of FIG. 7, the copy target data, and the saving target data are examples of "first scan data", "second scan data" and "third scan data", respectively. S150 to S154, S160 to S165, and S170 executed in FIGS. 8 to 10 are examples of "a predetermined process".

The Adobe RGB color space is an example of "a copying color space", "a first color space", and "a second color space". The sRGB color space is an example of "a saving color space", "a third color space", and "a different color space". JPEG, PDF, Searchable PDF, and DOC are examples of "a predetermined file format". PDF/A and Signed PDF are examples of "a different file format". JPEG, PDF, PDF/A, and Signed PDF are examples of "a first file format". Searchable PDF and DOC are examples of "a second file format".

(Second Embodiment)

The second embodiment is different from the first embodiment in that the editing of the scan data is not executed and in that the specific color conversion process is executed by the MFP 100.

As shown in FIG. 1, in the present embodiment, the memory 134 stores a specific profile 142. The specific profile 142 is a profile the same as the specific profile 310. On the other hand, the conversion server 300 does not store the specific profile 310.

The scan saving process of the present embodiment is the same as the scan saving processes of FIGS. 2 and 4. On the other hand, in the present embodiment, since the editing of the scan data is not executed, in the copying process of FIG. 6, the processes of S250 to S289, S292 and S294 are not executed. Then, in S296, when receiving the printing instruction from the control server 200 in S290, the CPU 132 causes the print executing unit 116 to execute printing of the document image represented by the scan data (Adobe RGB, JPEG) generated in S242.

(Scan Saving Process and Copying Process; FIG. 7, and FIGS. 11 to 13)

Subsequently, with reference to FIG. 7 and FIGS. 11 to 13, a dual process in the present embodiment will be described. In the dual process of the present embodiment, processes the same as S312 to S342 of FIG. 7 are firstly executed.

Figure 11:
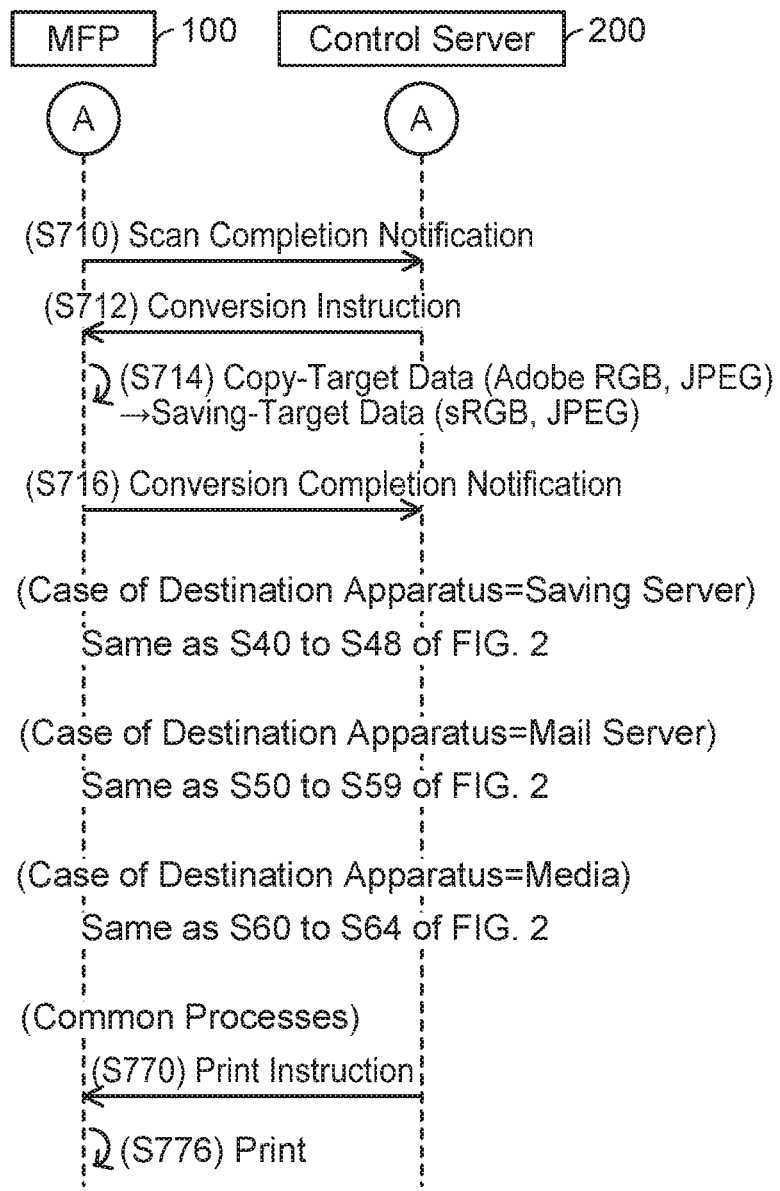
FIG. 11 illustrates a sequence diagram of Case D where JPEG is selected.

(Case D; FIG. 11)

Case D is a case where JPEG is selected in the format selection screen SC5 of FIG. 3 and the specific file format is JPEG. In S710, the CPU 132 sends a scan completion notification to the control server 200.

When receiving the scan completion notification from the MFP 100, the CPU 232 sends a conversion instruction to the MFP 100 in S712.

When receiving the conversion instruction from the control server 200, the CPU 132 duplicates the copy target data (Adobe RGB, JPEG). In S714, the CPU 132 executes the specific color conversion process to one of the two copy target data (Adobe RGB, JPEG) in accordance with the conversion instruction, and generates saving target data (sRGB, JPEG). Due to this, a state is created where the saving target data (sRGB, JPEG) and the copy target data (Adobe RGB, JPEG) are both stored in the MFP 100. In S716, the CPU 132 sends a conversion completion notification indicating that the color conversion of the scan data has been completed, to the control server 200.

In the case where the destination apparatus is the saving server, processes the same as S40 to S48 of FIG. 2 are executed. Further, in the case where the destination apparatus is the mail server, processes the same as S50 to S59 of FIG. 2 are executed. Further, in the case where the destination apparatus is the media, processes the same as S60 to S64 of FIG. 2 are executed. This completes the scan saving process where the CPU 232 causes the destination apparatus to save the saving target data (sRGB, JPEG).

Whatever the destination apparatus is, the processes of S770 and S776 are executed. In S770, the CPU 232 sends a printing instruction to the MFP 100.

When receiving the printing instruction from the control server 200, the CPU 132 causes the print executing unit 116 to execute printing of a document image represented by the copy target data (Adobe RGB, JPEG) in S776. In the present case, even without using the conversion server 300, the same effects as Case A of the first embodiment can be achieved.

Figure 12:
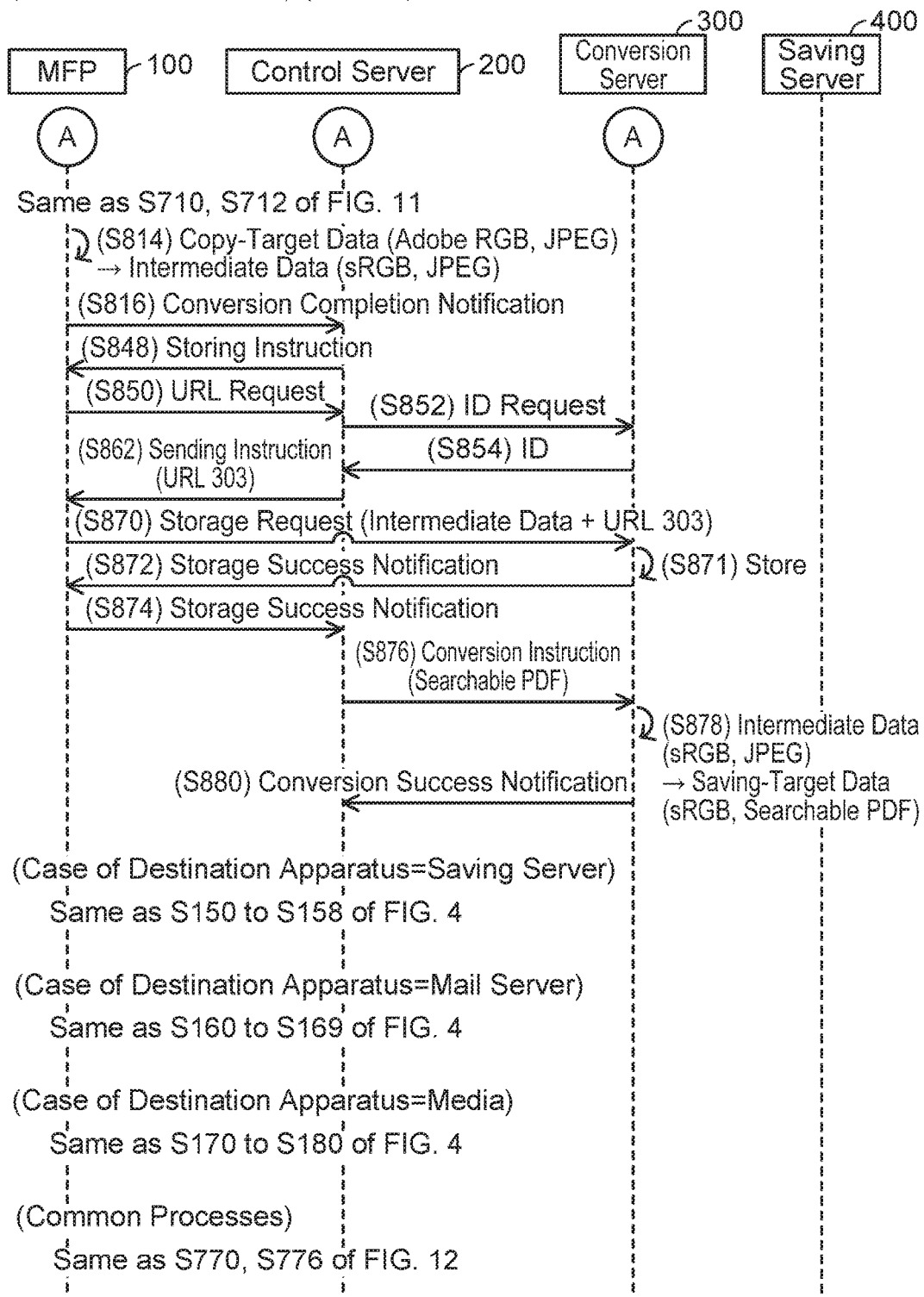
FIG. 12 illustrates a sequence diagram of Case E where Searchable PDF is selected.

(Case E; FIG. 12)

Case E is a case where Searchable PDF is selected in the format selection screen SC5 of FIG. 3 and the specific file format is JPEG. Firstly, processes the same as S710 and S712 of FIG. 11 are executed.

The CPU 132, when receiving the conversion instruction from the control server 200, duplicates the copy target data (Adobe RGB, JPEG). In S814, the CPU 132 executes the specific color conversion process to one of the two copy target data (Adobe RGB, JPEG), and generates intermediate data (sRGB, JPEG).

S816 is the same as S716 of FIG. 11. In S848, the CPU 232 sends a storage instruction for storing the scan data in the conversion server 300 to the MFP 100.

S850 to S862 are the same as S350 to S362 of FIG. 7. In S870, the CPU 132 sends a storage request including the intermediate data (sRGB, JPEG), setting the URL 303 as the sending target.

In S871, when receiving the storage request from the MFP 100, the conversion server 300 stores the intermediate data (sRGB, JPEG) at a location indicated by the URL 303 included in the storage request. S872 to S876 are respectively the same as S141 to S146 of FIG. 4. S878 is the same as S520 of FIG. 9. S880 is the same as S148 of FIG. 4.

In the case where the destination apparatus is the saving server, processes the same as S150 to S158 of FIG. 4 are executed. In the case where the destination apparatus is the mail server, processes the same as S160 to S169 of FIG. 4 are executed. In the case where the destination apparatus is the media, processes the same as S170 to S180 of FIG. 4 are executed. Due to this, the scan saving process where the CPU 232 causes the destination apparatus to save the saving target data (sRGB, Searchable PDF).

Whatever the destination apparatus is, processes the same as S770 and S776 of FIG. 11 are executed. This completes the copying process. Also in the present case, the same effects as Case B of the first embodiment can be achieved.

(Case F; FIG. 13)

Case F is a case where Signed PDF is selected in the format selection screen SC5 of FIG. 3 and the specific file format is Signed PDF. S910 is the same as S710 of FIG. 11.

In the case where the destination apparatus is the saving server, processes the same as S40 to S48 of FIG. 2 are executed. In the case where the destination apparatus is the mail server, processes the same as S50 to S59 of FIG. 2 are executed. In the case where the destination apparatus is the media, processes the same as S60 to S64 of FIG. 2 are executed. This completes the scan saving process where the CPU 232 causes the destination apparatus to store the saving target data (Adobe RGB, Signed PDF).

Whatever the destination apparatus is, processes the same as S770 and S776 of FIG. 11 are executed. This completes the copying process. Also in the present case, even without using the conversion server 300, the same effects as Case C of the first embodiment can be achieved.

(Modification 1)

In each of the above embodiments, the user performs the operation for executing the dual process to the MFP 100 (S314 of FIG. 7). Instead of this, the user may perform the operation to an external apparatus. In this case, the MFP 100 may receive the operation information from the external apparatus, and sends the operation information to the control server 200. That is, "a first instruction" may not be an operation.

(Modification 2)

The control server 200 and the conversion server 300 may not be configured separately, but may be configured integrally. That is, "a predetermined server" may be "a control server".

(Modification 3)

In each of the embodiments, the copy target data may be expressed by the sRGB color space. That is, "a copying color space" and "a second color space" may be the sRGB color space. Further, the saving target data may be expressed by the Adobe RGB color space. That is, "a saving color space" and "a third color space" may be the Adobe RGB color space.

(Modification 4)

In each of the above embodiments, the control server 200 may not cause the MFP 100 to display the format selection screen SC5 of FIG. 3. In this case, the control server 200 does not receive the format information at S320 of FIG. 7. That is, "receive, from the multifunction peripheral, format information" may be omitted.

(Modification 5)

In Case B of FIG. 9, the conversion server 300 may convert, instead of S518 and S520, the intermediate data (Adobe RGB, Searchable PDF) to saving target data (sRGB, Searchable PDF) after converting the scan data (Adobe RGB, JPEG) to the intermediate data (Adobe RGB, Searchable PDF). That is, after "a color converting process" is executed, "a file format converting process" may be executed by the predetermined server.

(Modification 6)

In each of the above embodiments, the CPU 232 may not receive the saving success notification (S48 of FIG. 2). That is, "receive a notification indicating that the third scan data has been saved in the destination apparatus" may be omitted.

(Modification 7)

In each of the above embodiments, the respective processes in FIGS. 2, 4, and FIGS. 6 to 13 are realized by software (i.e., program), alternatively, at least one of these processes may be realized by hardware such as a logic circuit.

What is claimed is:

1. A control server configured to control a multifunction peripheral capable of executing scan and print, the control server comprising:

a processor; and a first memory storing computer-readable instructions therein, the computer-readable instructions, when executed by the processor, causing the control server to:

receive, from the multifunction peripheral, instruction information indicating that a first instruction has been accepted at the multifunction peripheral, the instruction information including information for executing both processes of a scan saving process for saving scan data representing a document image in a destination apparatus and a copying process for copying the document image;

in a case where the instruction information is received, send a scan instruction to the multifunction peripheral, the scan instruction being for causing the multifunction peripheral to execute a generating process included in the both processes, the generating process being for generating first scan data representing the document image;

send a sending instruction to the multifunction peripheral, the sending instruction being for causing the multifunction peripheral to execute a sending process included in the copying process, the sending process being for sending the first scan data to a predetermined server configured separately from the multifunction peripheral;

send a print instruction to the multifunction peripheral, the print instruction being for causing the multifunction peripheral to execute a receiving process and a printing process that are included in the copying process, the receiving process being for receiving, from the predetermined server, second scan data obtained using the first scan data, and the printing process being for printing the document image represented by the second scan data; and execute a predetermined process included in the scan saving process, the predetermined process being for saving, in the destination apparatus, third scan data obtained using the first scan data.

2. The control server as in claim 1, wherein
the predetermined process includes:
  a process for obtaining the third scan data from a second memory of the predetermined server; and
  a process for sending the third scan data to the destination apparatus.

3. The control server as in claim 1, wherein
the scan instruction is for causing the multifunction peripheral to execute the generating process being for generating the first scan data expressed by a copying color space, and
the copying color space is a color space that expresses scan data generated by the multifunction peripheral in a case where a second instruction indicating execution of only the copying process among the scan saving process and the copying process is accepted at the multifunction peripheral.

4. The control server as in claim 3, wherein
the predetermined process is for saving, in the destination apparatus, the third scan data expressed by a saving color space different from the copying color space, and
the saving color space is a color space that expresses scan data generated by the multifunction peripheral in a case where a third instruction indicating execution of only the scan saving process among the scan saving process and the copying process is accepted at the multifunction peripheral.

5. The control server as in claim 4, wherein
the computer-readable instructions, when executed by the processor, further cause the control server to:
receive, from the multifunction peripheral, format information indicating a file format of the third scan data to be saved in the destination apparatus,
wherein in a case where the instruction information and the format information indicating a predetermined file format are received, the predetermined process is executed in order to save the third scan data expressed by the saving color space in the destination apparatus, and
in a case where the instruction information and the format information indicating a file format different from the predetermined file format are received, the predetermined process is executed in order to save the third scan data expressed by the copying color space in the destination apparatus is executed.

6. The control server as in claim 1, wherein
the computer-readable instructions, when executed by the processor, further cause the control server to:
receive format information indicating a file format of the third scan data to be saved in the destination apparatus,
wherein in a case where the instruction information and the format information indicating a second file format which the multifunction peripheral is incapable of generating are received, the scan instruction is sent to the multifunction peripheral in order to cause the multifunction peripheral to execute the generating process for generating the first scan data having a first file format which the multifunction peripheral is capable of generating, the first file format being different from the second file format, and
in the case where the instruction information and the format information indicating the second file format are received, the predetermined process is executed in order to save the third scan data having the second file format in the destination apparatus, wherein the third scan data having the second file format is generated by the predetermined server from the first scan data having the first file format.

7. The control server as in claim 6, wherein
the third scan data having the second file format is generated by following processes executed by the predetermined server:
  a color converting process on the first scan data having the first file format and expressed by a copying color space; and
  a file format converting process on intermediate scan data generated by the color converting process, the intermediate scan data having the first file format and expressed by a saving color space different from the copying color space.

8. The control server as in claim 1, wherein
the computer-readable instructions, when executed by the processor, further cause the control server to:
receive a notification indicating that the third scan data has been saved in the destination apparatus, and
the print instruction is sent to the multifunction peripheral after the notification has been received.

9. A non-transitory computer-readable storage medium storing computer-readable instructions for a control server,
wherein the computer-readable instructions, when executed by a processor of the control server, cause the control server to;
receive, from a multifunction peripheral, instruction information indicating that a first instruction has been accepted at the multifunction peripheral, the instruction information including information for executing both processes of a scan saving process for saving scan data representing a document image in a destination apparatus and a copying process for copying the document image;
in a case where the instruction information is received,
send a scan instruction to the multifunction peripheral, the scan instruction being for causing the multifunction peripheral to execute a generating process included in the both processes, the generating process being for generating first scan data representing the document image;
send a sending instruction to the multifunction peripheral, the sending instruction being for causing the multifunction peripheral to execute a sending process included in the copying process, the sending process being for sending the first scan data to a predetermined server configured separately from the multifunction peripheral;
send a print instruction to the multifunction peripheral, the print instruction being for causing the multifunction peripheral to execute a receiving process and a printing process that are included in the copying process, the receiving process being for receiving, from the predetermined server, second scan data obtained using the first scan data, and the print process being for printing the document image represented by the second scan data; and
execute a predetermined process included in the scan saving process, the predetermined process being for saving, in the destination apparatus, third scan data obtained using the first scan data.

* * * * *